(12) United States Patent
Tsukagoshi

(10) Patent No.: US 11,418,838 B2
(45) Date of Patent: Aug. 16, 2022

(54) RECEPTION DEVICE, RECEPTION METHOD, TRANSMISSION DEVICE, AND TRANSMISSION METHOD

(71) Applicant: SATURN LICENSING LLC, New York, NY (US)

(72) Inventor: Ikuo Tsukagoshi, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/980,770

(22) PCT Filed: May 16, 2019

(86) PCT No.: PCT/JP2019/019590
§ 371 (c)(1),
(2) Date: Sep. 14, 2020

(87) PCT Pub. No.: WO2019/230432
PCT Pub. Date: Dec. 5, 2019

(65) Prior Publication Data
US 2021/0092478 A1    Mar. 25, 2021

(30) Foreign Application Priority Data

May 30, 2018 (JP) .............................. JP2018-104143

(51) Int. Cl.
*H04N 21/4385* (2011.01)
*H04N 21/435* (2011.01)
*H04N 21/4402* (2011.01)

(52) U.S. Cl.
CPC ....... *H04N 21/4385* (2013.01); *H04N 21/435* (2013.01); *H04N 21/4402* (2013.01)

(58) Field of Classification Search
None
See application file for complete search history.

(56) References Cited

U.S. PATENT DOCUMENTS

2015/0156469 A1* 6/2015 Qu .......................... G09G 5/006
                                                           348/43
2015/0249848 A1* 9/2015 Holman ............. H04N 21/6582
                                                           348/469

(Continued)

FOREIGN PATENT DOCUMENTS

AU    2016309262 A1    2/2018
GB       2505640 A     3/2014

(Continued)

OTHER PUBLICATIONS

International Search Report dated Jul. 23, 2019 in PCT/JP2019/019590 filed on May 16, 2019, 2 pages.

(Continued)

*Primary Examiner* — William J Kim
(74) *Attorney, Agent, or Firm* — Chris Kolefas

(57) ABSTRACT

High frame rate image data having backward compatibility is favorably transmitted. Image data of each picture of a base layer included in a base stream sent from a transmission side has been subjected to a mixing process in a linear space or a non-linear space. On a reception side, the inverse mixing process can be performed appropriately by performing in a corresponding space on the basis of processing space information indicating whether or not the mixing process is performed in the linear space or the non-linear space.

20 Claims, 25 Drawing Sheets

(56) References Cited

U.S. PATENT DOCUMENTS

| | | | |
|---|---|---|---|
| 2016/0234500 A1 | 8/2016 | Tsukagoshi | |
| 2016/0345032 A1* | 11/2016 | Tsukagoshi | ........ H04N 21/2343 |
| 2017/0076674 A1* | 3/2017 | Shintani | ................ G09G 5/363 |
| 2017/0127126 A1* | 5/2017 | Strein | ................ H04N 21/6125 |
| 2018/0227596 A1 | 8/2018 | Tsukagoshi | |
| 2019/0045156 A1* | 2/2019 | Oh | ........................... H04N 7/56 |

FOREIGN PATENT DOCUMENTS

| | | |
|---|---|---|
| WO | WO 2017/030062 A1 | 2/2017 |
| WO | WO 2017/056956 A1 | 4/2017 |
| WO | WO 2018/198914 A1 | 11/2018 |
| WO | WO 2018/235666 A1 | 12/2018 |

OTHER PUBLICATIONS

Schwarz, H., et al.. "Overview of the Scalable Video Coding Extension of the H.264/AVC Standard", IEEE Transactions on Circuits and Systems for Video Technology, vol. 17, No. 9, Sep. 1, 2007 (Sep. 1, 2007), pp. 1103-1120, XP055378169,us ISSN: 1051-8215, DOI: 10.1109/TCSVT.2007.905532 /\sectionV.basic consepts for extending H.264/SVC Towards an SVC Standard,subsectton"A. temporal Scalability".

* cited by examiner

FIG. 4
(a) 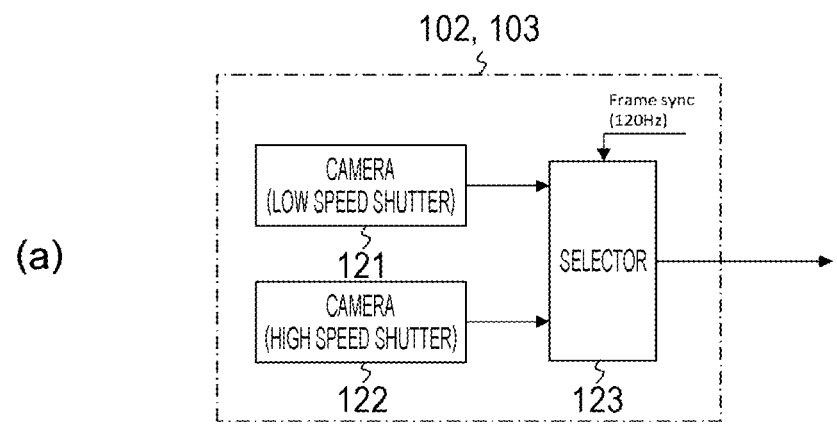
(b) 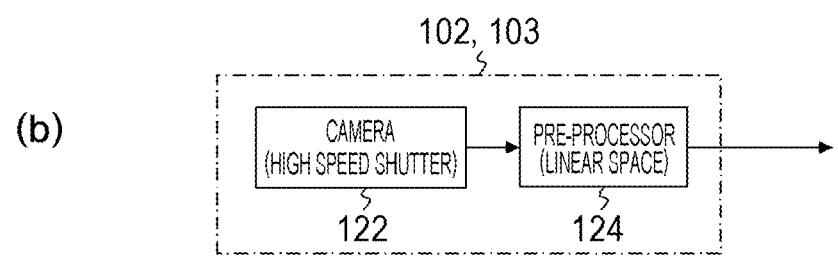
(c) 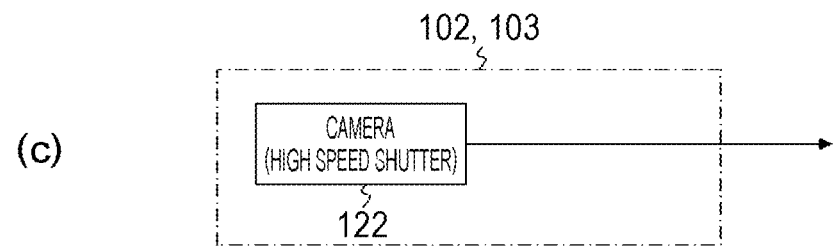

FIG. 5
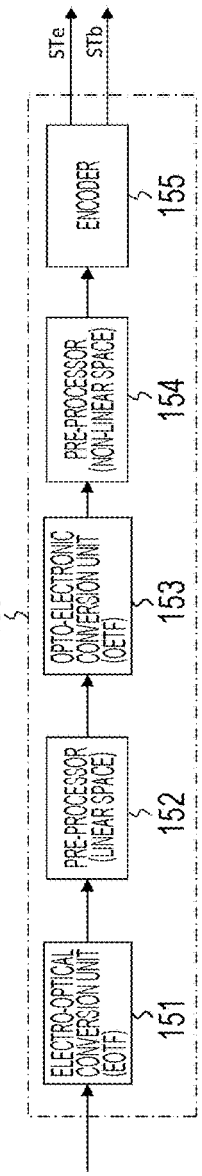
(a)
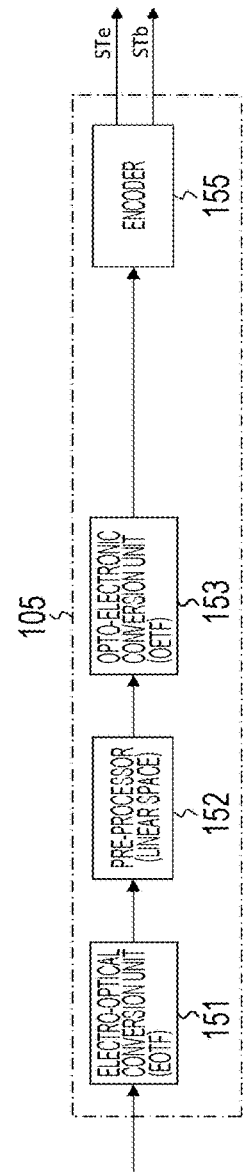
(b)
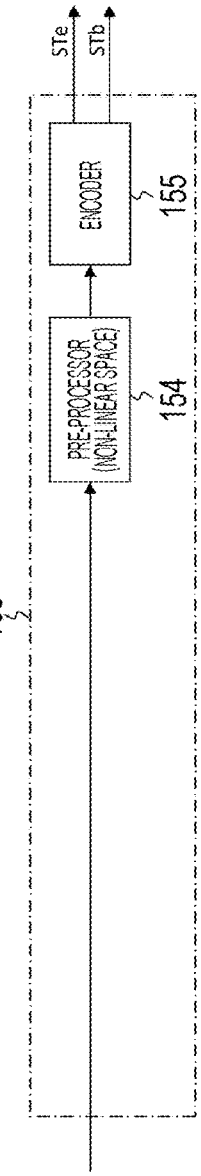
(c)
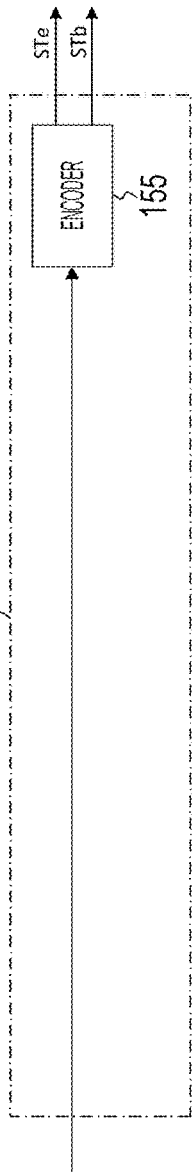
(d)

FIG. 19

SELECTION OF LINEAR OR NON-LINEAR SPACE (a)
- naturality OF MIXED IMAGE
- Bitrate

SELECTION OF MIXING RATIO (b)
- MEASURE AGAINST Strobing
- DEGREE OF MOTION BLUR
- PRESENCE OR ABSENCE OF NECESSITY OF POST-PROCESSING

FIG. 21

| Syntax | No. of Bits | Format |
|---|---|---|
| blending_option( ) { | | |
|     blending_flag | 1 | bslbf |
|     reserved | 7 | bslbf |
|     if ( blending_flag) { | | bslbf |
|         direction_type | 1 | uimsbf |
|         linear_blending_process_flag | 1 | bslbf |
|         reserved | 2 | bslbf |
|         blending_coefficient_ratio | 4 | uimsbf |
|     } | | |
| } | | |

FIG. 22

| blending_flag (1bit) | FLAG INDICATING WHETHER MIXING PROCESS IS PERFORMED<br>1: MIXING PROCESS IS PERFORMED    0: MIXING PROCESS IS NOT PERFORMED |
|---|---|
| direction_type (1bit) | INDICATES, WHEN SEI IS ADDED TO enhanced picture, TEMPORAL RELATIONSHIP OF base picture SUBJECTED TO MIXING PROCESS WITH THIS enhanced picture<br>1: MIXING PROCESS BETWEEN enhanced picture AND ONE SUBSEQUENT base picture<br>0: MIXING PROCESS BETWEEN enhanced picture AND ONE PREVIOUS base picture<br><br>INDICATES, WHEN SEI IS ADDED TO base picture, TEMPORAL RELATIONSHIP OF enhanced picture SUBJECTED TO MIXING PROCESS WITH THIS base picture<br>1: MIXING PROCESS BETWEEN base picture AND ONE SUBSEQUENT enhanced picture<br>0: MIXING PROCESS BETWEEN base picture AND ONE PREVIOUS enhanced picture |
| linear_blending_process_flag (1bit) | FLAG INDICATING WHETHER MIXING PROCESS IS PERFORMED IN LINEAR SPACE OR NON-LINEAR SPACE<br>0: PERFORMED IN NON-LINEAR SPACE    1: PERFORMED IN LINEAR SPACE |
| blending_coefficient_ratio (4bits) | INDICATES COEFFICIENT (a : b) REPRESENTING MIXING RATIO AT TIME OF MIXING OPERATION<br>(a IS COEFFICIENT FOR extended picture, b IS COEFFICIENT FOR base picture)<br>"0",  1 : 1    "4",  2 : 3<br>"1",  1 : 2    "5",  3 : 4<br>"2",  1 : 3    "6",  3 : 7<br>"3",  1 : 4    "7",  3 : 8 |

*FIG. 23*

| Syntax | No. of Bits | Format |
|---|---|---|
| blending_option descriptor( ) { | | |
|     descriptor_tag | 8 | bslbf |
|     descriptor_length | 8 | uimsbf |
|     blending_flag | 1 | bslbf |
|     reserved | 7 | bslbf |
|     if ( blending_flag) { | | bslbf |
|       direction_type | 1 | uimsbf |
|       linear_blending_process_flag | 1 | bslbf |
|       reserved | 2 | bslbf |
|       blending_coefficient_ratio | 4 | uimsbf |
|     } | | |
| } | | |

RECEPTION DEVICE, RECEPTION METHOD, TRANSMISSION DEVICE, AND TRANSMISSION METHOD

TECHNICAL FIELD

The present technology relates to a reception device, a reception method, a transmission device, and a transmission method, and more specifically, to a reception device and the like that receives high frame rate image data having backward compatibility.

BACKGROUND ART

In a high frame rate distribution having backward compatibility, an encoded stream includes a base layer and an enhanced layer. When a receiver that is not adaptable to a high frame rate receives the high frame rate distribution, the receiver receives and decodes only the stream of the base layer. In this case, sub-sampling is temporally performed, and thus continuity of movement is lost between sub-sampled frames and a moving image with an unnatural motion is displayed.

Therefore, in order to reduce discontinuity (strobing) of motion, the present applicant has previously proposed that a mixing process is performed for the base layer in the preceding stage of an encoder and then distribution is performed, and a receiver that is adaptable to the high frame rate restores the mixing process to the original state in a subsequent stage of the decoder and then use the data (see Patent Document 1). In this case, in a conventional receiver that is adaptable to the high frame rate that does not have a function of releasing the mixing process, an image having subjected to the mixing process is displayed for every frame.

CITATION LIST

Patent Document

Patent Document 1: WO 2017/030062

SUMMARY OF THE INVENTION

Problems to be Solved by the Invention

An object of the present technology is to favorably transmit high frame rate image data having backward compatibility.

Solutions to Problems

The concept of the present technology resides in a reception device including a reception unit that receives a container including a base stream and an enhanced stream, in which the base stream is obtained by obtaining image data of each picture of a base layer by performing a mixing process in units of two temporally consecutive pictures in image data at a predetermined frame rate, and encoding the image data of each picture of the base layer, the mixing process is performed in a linear space or a non-linear space, the enhanced stream is obtained by obtaining the image data of each picture of the enhanced layer by extracting image data of one picture in the units of two temporally consecutive pictures, and encoding the image data of each picture of the enhanced layer, the reception device further includes a processing unit that performs a process of decoding the base stream to obtain the image data of each picture of the base layer, a process of decoding the enhanced stream to obtain image data of one picture in the units of two consecutive pictures of the image data at the predetermined frame rate, which is the image data of each picture of the enhanced layer, a process of performing an inverse mixing process, which is an inverse process of the mixing process, on the image data of each picture of the base layer by using the image data of the one picture to obtain image data of the other picture in the units of two temporally consecutive pictures, and a process of combining the image data of the one picture and the image data of the other picture to obtain image data at the predetermined frame rate, and the processing unit performs the inverse mixing process in a corresponding space on the basis of processing space information indicating whether the mixing process is performed in the linear space or performed in the non-linear space.

In the present technology, the reception unit receives the container including the base stream and the enhanced stream. For example, the reception unit may be configured to receive the container via a broadcast transmission path. Here, the base stream is obtained by obtaining the image data of each picture of the base layer by performing the mixing process in units of two temporally consecutive pictures in image data at a predetermined frame rate, and encoding the image data of each picture of the base layer, and the mixing process is performed in the linear space or the non-linear space. Further, an encoded stream of the enhanced layer is obtained by obtaining the image data of each picture of the enhanced layer by extracting image data of one picture in the units of two temporally consecutive pictures, and encoding the image data of each picture of the enhanced layer.

The processing unit performs the following respective processes. That is, a process of decoding the base stream to obtain the image data of each picture of the base layer is performed. Further, a process of decoding the enhanced stream to obtain image data of one picture in the units of two consecutive pictures of image data at the predetermined frame rate, which is the image data of each picture of the enhanced layer, is performed. Further, a process of performing an inverse mixing process, which is an inverse process of the mixing process, on the image data of each picture of the base layer by using the image data of the one picture to obtain image data of the other picture in the units of two temporally consecutive pictures is performed. Further, a process of combining the image data of the one picture and the image data of the other picture to obtain image data at the predetermined frame rate is performed. Here, the inverse mixing process is performed in the corresponding space on the basis of the processing space information indicating whether the mixing process is performed in the linear space or the non-linear space.

For example, the processing space information may be inserted in a layer of the base stream or a layer of the enhanced stream. In this case, for example, the base stream and the enhanced stream may have a NAL unit structure, and the base stream or the enhanced stream may include a NAL unit including processing space information. Further, for example, the processing space information may be inserted in the layer of the container.

Further, for example, the mixing processing information may be inserted in a layer of the stream or a layer of the container, and the processing unit may perform the inverse mixing process on the basis of the mixing processing information. In this case, for example, the mixing process information may include information on a mixing ratio in the mixing process. Further, in this case, for example, the mixing process information may include information indicating a temporal relative positional relationship between the one picture and the other picture in the units of two consecutive pictures. Furthermore, for example, a display unit that displays an image by the image data of the predetermined frame rate obtained by the processing unit may be further provided.

As described above, in the present technology, the image data of each picture of the base layer included in the base stream is subjected to the mixing process in the linear space or the non-linear space, and the inverse mixing process is performed in the corresponding space on the basis of the processing space information indicating whether the mixing process is performed in the linear space or in the non-linear space. Therefore, the inverse mixing process can be appropriately performed, and the image data having the predetermined frame rate can be accurately obtained.

Further, another concept of the present technology resides in a transmission device including:

a processing unit that obtains a base stream by obtaining image data of each picture of a base layer by performing a mixing process in units of two temporally consecutive pictures in image data at a predetermined frame rate, and encoding the image data of each picture of the base layer, and obtains an enhanced stream by obtaining the image data of each picture of the enhanced layer by extracting image data of one picture in the units of two temporally consecutive pictures, and encoding the image data of each picture of the enhanced layer; and a transmission unit that transmits the base stream and the enhanced stream, in which the processing unit performs the mixing process in a linear space.

In the present technology, the processing unit obtains the base stream and the enhanced stream. Here, the base stream is obtained by obtaining image data of each picture of the base layer by performing the mixing process in units of two temporally consecutive pictures in image data at a predetermined frame rate, and encoding the image data of each picture of the base layer. Further, the enhanced stream is obtained by obtaining the image data of each picture of the enhanced layer by extracting the image data of one picture in the units of two temporally consecutive pictures, and encoding the image data of each picture of the enhanced layer. The transmission unit transmits the base stream and the enhanced stream.

In the processing unit, the mixing process is performed in the linear space. For example, the processing unit processes as follows. First, image data of each picture of a base layer is obtained by performing a mixing process in units of two temporally consecutive pictures in image data in a linear space at a predetermined frame rate, and image data of each picture of an enhanced layer is obtained by extracting image data of one picture in the units of two temporally consecutive pictures. Next, non-linear conversion is performed on the image data of the base layer and the enhanced layer. Then, the non-linearly converted image data of each picture of the base layer and the enhanced layer is encoded to obtain the base stream and the enhanced stream.

As described above, in the present technology, the image data of each picture of the base layer included in the base stream is subjected to the mixing process in the linear space. Therefore, merits of mixing in the linear space can be enjoyed.

Effects of the Invention

According to the present technology, high frame rate image data having backward compatibility can be favorably transmitted. Note that the effect described here is not necessarily limited, and may be any one of the effects described in the present disclosure.

BRIEF DESCRIPTION OF DRAWINGS

FIG. 4 is a block diagram illustrating specific configuration examples of a camera and an HFR processing unit.

FIG. 5 is a diagram illustrating specific configuration examples of a part of an encoding unit.

FIG. 19 is a diagram for explaining determination of a linear space or a non-linear space and selection of a mixing ratio.

FIG. 21 is a diagram illustrating a structural example of a blending option SEI.

FIG. 22 is a diagram illustrating a content of main information in a structural example of FIG. 20.

FIG. 23 is a diagram illustrating a structural example of a blending option descriptor.

MODE FOR CARRYING OUT THE INVENTION

Hereinafter, modes for carrying out the present disclosure (hereinafter referred to as embodiments) will be described. Note that the description will be made in the following order.
1. Embodiment
2. Modification example 1. Embodiment

[Transmission-Reception System]

Figure 1:
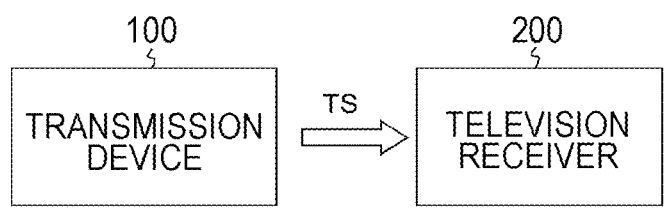
FIG. 1 is a block diagram illustrating a configuration example of a transmission-reception system as an embodiment.

FIG. 1 illustrates a configuration example of a transmission-reception system 10 as an embodiment. The transmission-reception system 10 has a configuration including a transmission device 100 and a reception device 200.

The transmission device 100 transmits a transport stream TS on a broadcast wave. This transport stream TS constitutes a container as a multiplexed stream. This transport stream TS includes a base stream that is an encoded stream of a base layer obtained from high frame rate, which is a predetermined frame rate, 120 Hz in this embodiment, image data (moving image data), and an enhanced stream that is an encoded stream of an enhanced layer.

In this embodiment, the base stream and the enhanced stream have a NAL unit structure. The base stream includes encoded image data of each picture of the base layer as an access unit. Further, the enhanced stream includes encoded image data of each picture of the enhanced layer as an access unit.

Here, the base stream is obtained by obtaining the image data of each picture of the base layer by performing the mixing process in units of two temporally consecutive pictures in 120 Hz image data, and encoding the image data of each picture of the base layer, and the mixing process is performed in the linear space or the non-linear space. Here, the frame rate of the image data of each picture in the base layer is 60 Hz.

Further, the enhanced stream is obtained by obtaining the image data of each picture of the enhanced layer by extracting image data of one picture in the units of two temporally consecutive pictures, and encoding the image data of each picture of the enhanced layer. Here, the frame rate of the image data of each picture in the enhanced layer is 60 Hz.

Figure 2:
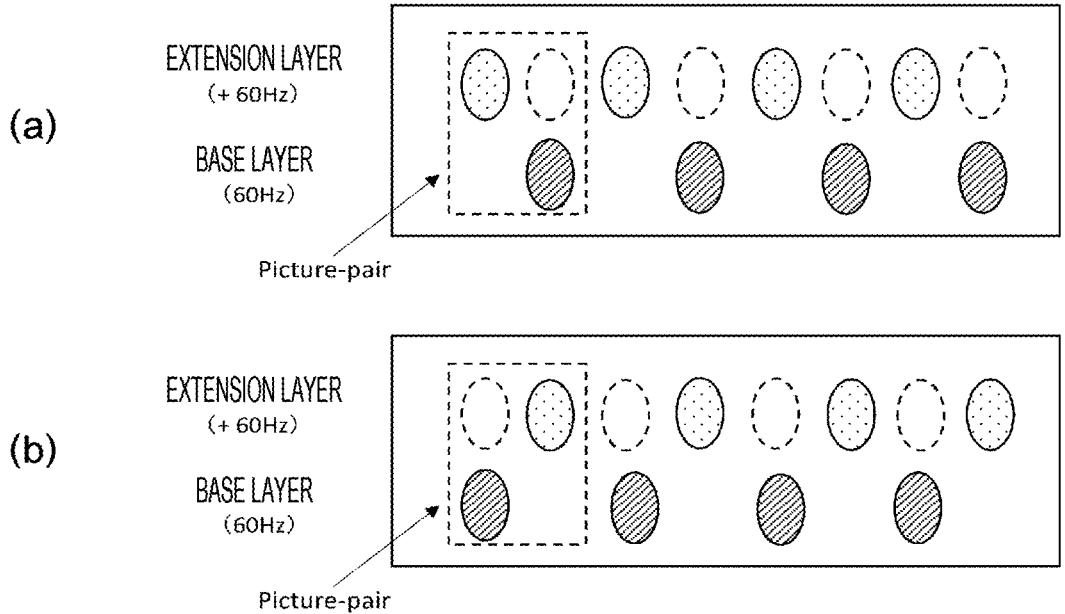
FIG. 2 is a diagram illustrating examples of 60 Hz base layer image data and +60 Hz enhanced layer image data obtained by performing a mixing process on 120 Hz image data.

FIGS. 2(a) and 2(b) illustrate an example of image data of the 60 Hz base layer and image data of the +60 Hz enhanced layer, which are obtained by performing the mixing process on the 120 Hz image data. A picture pair (Picture-pair) is formed by two pictures including one picture (frame) forming the image data of the base layer and one picture (frame) of the image data of the enhanced layer adjacent thereto.

In FIG. 2(a), in each picture pair, the image data of a picture of the enhanced layer, which is the first picture, is in a state of being not mixed (non-mixed state), but the image data of one subsequent picture of the base layer is in a state of being mixed (mixed state) with the image data of one previous picture of the enhanced layer. Further, in FIG. 2(b), in each picture pair, the image data of a picture of the base layer, which is the first picture, is in a state of being mixed (mixed state) with the image data of one subsequent picture of the enhanced layer, but the image data of the subsequent picture of the enhanced layer is in a state of being not mixed (non-mixed state). Hereinafter, in this embodiment, it is assumed that the relationship between each picture pair will be basically described as being in the pattern of FIG. 2(a).

Processing space information and mixing process information are inserted in the layer of the stream (base stream, enhanced stream) and/or the layer of the container as information necessary for performing an inverse mixing process on a reception side. The processing space information indicates whether the mixing process is performed in a linear space or a non-linear space. Further, the mixing process information includes information on a mixing ratio in the mixing process, information indicating a temporal relative positional relationship between one picture (picture of the enhanced layer) and the other picture (picture of the base layer) in the unit of two consecutive pictures, and the like.

Referring back to FIG. 1, the television receiver 200 receives the transport stream TS described above sent from the transmission device 100 on the broadcast wave. In a case of having a decoding capability capable of processing 60 Hz (normal frame rate) image data, the reception device 200 processes only the base stream included in the transport stream TS to obtain 60 Hz image data and reproduces the image. In this case, the television receiver 200 performs a decoding process on the base stream to obtain image data of each frame at 60 Hz.

Further, in a case of having a decoding capability capable of processing 120 Hz (high frame rate) image data and having an inverse mixing process function, the television receiver 200 processes both the base stream and the enhanced stream included in the transport stream TS as follows to obtain 120 Hz image data and reproduces the image.

In this case, the television receiver 200 decodes the base stream to obtain the image data of each picture of the base layer, decodes the enhanced stream to obtain image data of one picture in units of two consecutive pictures of 120 Hz image data, which is the image data of each picture of the enhanced layer, performs an inverse mixing process, which is the inverse process of the mixing process, on the image data of each picture of the base layer by using the image data of the one picture to obtain image data of the other picture in the units of two temporally consecutive pictures, and combines the image data of the one picture and the image data of the other picture to obtain 120 Hz image data. Note that even in the case of having the inverse mixing process function, if not having the inverse mixing process function in the same space as the mixing process on the transmission side, the operation is similar to that in a case of not having the inverse mixing process function as follows.

Further, in a case where the television receiver 200 has a decoding capability capable of processing 120 Hz (high frame rate) image data and does not have the inverse mixing processing function, both the base stream and the enhanced stream included in the transport stream TS are processed as follows to obtain 120 Hz image data and reproduce the image. In this case, the television receiver 200 decodes the base stream to obtain the image data of each picture of the base layer, decodes the enhanced stream to obtain the image data of each picture of the enhanced layer, and combines image data of each picture of the base layer and image data of each picture of the enhanced layer to obtain 120 Hz image data.

"Processing Outline of Transmission-Reception System"

Figure 3:
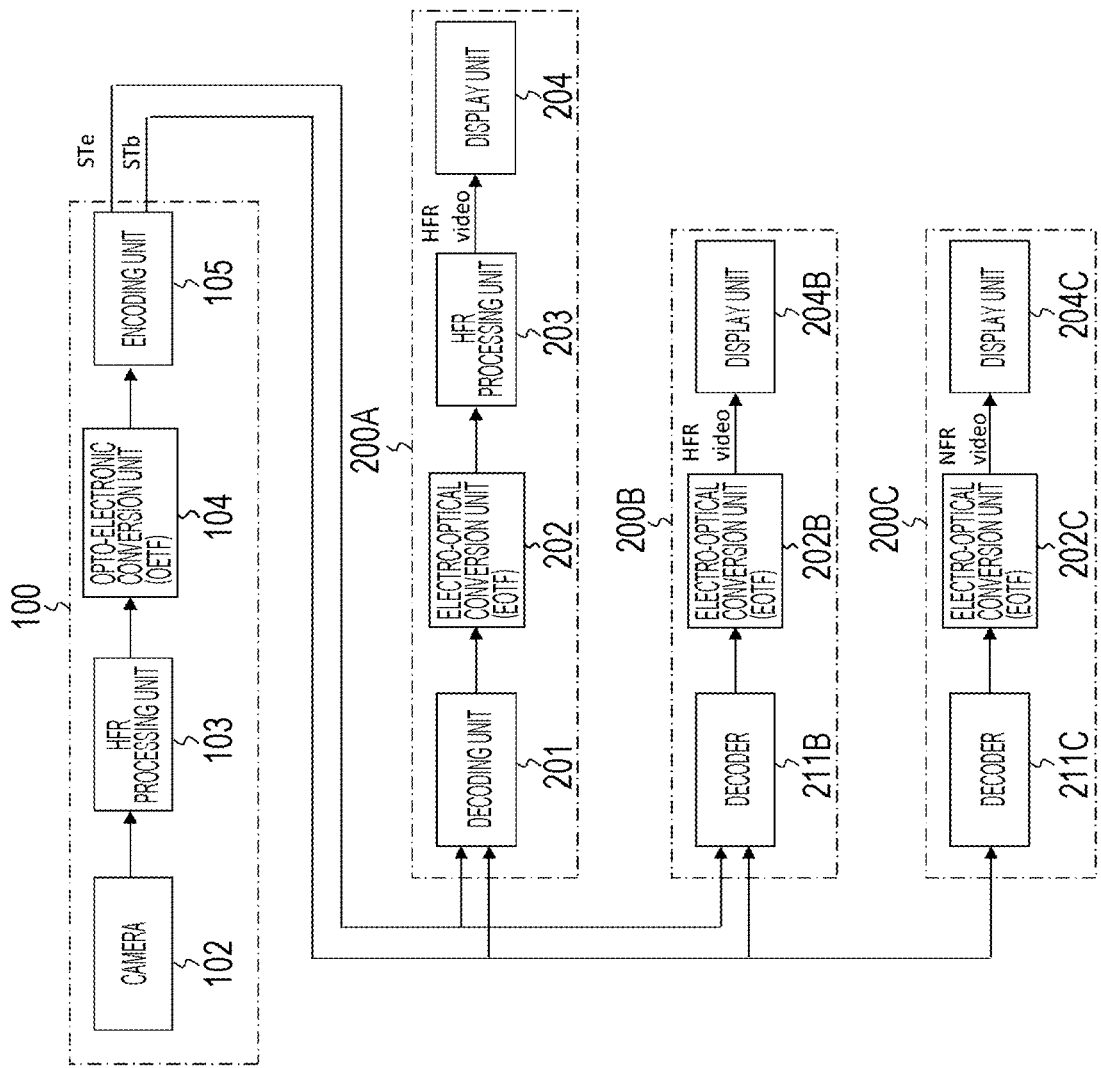
FIG. 3 is a diagram illustrating an outline of processing of a transmission device and television receivers.

FIG. 3 illustrates an outline of the transmission device 100 and television receivers 200 (200A, 200B, 200C). The transmission device 100 includes a camera 102, an HFR processing unit 103, an opto-electronic conversion unit 104, and an encoding unit 105. The opto-electronic conversion unit 103 applies opto-electronic conversion characteristics (OETF curve) to convert input image data from the linear space to the non-linear space and outputs the converted data.

FIGS. 4(a) to 4(c) illustrate specific configuration examples of a part of the camera 102 and the HFR processing unit 103. In the configuration example of FIG. 4(a), the part of the camera 102 and the HFR processing unit 103 includes a low-speed shutter camera 121, a high-speed shutter camera 122, and a selector 123. The camera 121 and the camera 122 are synchronously set so as to have the same viewpoints. From the camera 121, 60 Hz (normal frame rate) image data is obtained. From the camera 122, 120 Hz (high frame rate) image data is obtained.

The selector 123 alternately extracts image data of the cameras 121 and 122 in 120 Hz frame units, and uses the extracted data as an output of the part of the camera 102 and the HFR processing unit 103. In this case, the selector 123 extracts, in a unit of two frames, image data of a first frame of the camera 122 in the first frame and image data of the camera 121 in the second frame. Here, the image data of the camera 121 extracted in the second frame is equivalent to the image data of the first and second frames of the camera 122 mixed at a mixing ratio of 1:1. Note that in this case, the image data is in the linear space, and this mixing is performed in the linear space.

In the configuration example of FIG. 4(b), the part of the camera 102 and the HFR processing unit 103 includes a high-speed shutter camera 122 and a pre-processor 124. From the camera 122, 120 Hz (high frame rate) image data is obtained. The pre-processor 124 performs a mixing process on the image data of the camera 122, alternately outputs non-mixed image data and mixed image data in 120 Hz frame units, and uses the data as the output of the part of the camera 102 and the HFR processing unit 103. In this case, in units of two frames, image data of a first frame is output as it is in the first frame, and a mixture of image data of first and second frames in a predetermined mixing ratio is output in the second frame. In this case, the image data is in the linear space, and the mixing process in the pre-processor 124 is performed in the linear space.

In the configuration example of FIG. 4(c), the part of the camera 102 and the HFR processing unit 103 only includes the high-speed shutter camera 122. In this case, the 120 Hz image data as it is of the camera 122 becomes the output of the part of the camera 102 and the HFR processing unit 103.

FIGS. 5(a) to 5(d) illustrate specific configuration examples of a part of the encoding unit 105. In the configuration example of FIG. 5(a), the part of the encoding unit 105 includes an electro-optical conversion unit 151, a pre-processor 152, an opto-electronic conversion unit 153, a pre-processor 154, and an encoder 155. The electro-optical conversion unit 151 applies an electro-optical conversion characteristic (EOTF curve) to convert input image data from the linear space to the non-linear space and output the converted data.

The pre-processor 152 has a configuration similar to that of the pre-processor 124 described above. The pre-processor 152 performs the mixing process on input 120 Hz image data, and alternately outputs non-mixed image data and mixed image data in 120 Hz frame units. In this case, the image data is in the linear space, and the mixing process in the pre-processor 152 is performed in the linear space.

The opto-electronic conversion unit 153 applies opto-electronic conversion characteristics (OETF curve) to convert input image data from the linear space to the non-linear space and outputs the converted data. The pre-processor 154 is configured similarly to the pre-processors 124 and 152 described above. The pre-processor 154 performs the mixing process on the input 120 Hz image data, and alternately outputs non-mixed image data and mixed image data in 120 Hz frame units. In this case, the image data is in the non-linear space, and the mixing process in the pre-processor 154 is performed in the non-linear space. Note that the pre-processor 152 and the pre-processor 154 are selectively used, and when one is used, the other is placed in a through state in which the input image data as it is becomes the output image data. Note that details of the pre-processors 124, 152, and 154 will be described later.

The encoder 155 encodes the input image data by, for example, H.264/AVC, H.265/HEVC, or the like to obtain a base stream STb and an enhanced stream STe. Here, the input image data alternately changes to the image data of the non-mixed picture and the image data of the mixed picture in units of 120 Hz frames. The image data of the non-mixed picture forms image data of each picture of the enhanced layer, and the encoder 155 encodes the image data of each picture of the enhanced layer to obtain the enhanced stream STe. Further, the image data of the mixed pictures forms image data of each picture of the base layer, and the encoder 155 encodes the image data of each picture of the base layer to obtain the base stream STb.

In the configuration example of FIG. 5(b), the part of the encoding unit 105 includes the electro-optical conversion unit 151, the pre-processor 152, the opto-electronic conversion unit 153, and the encoder 155. In this configuration example, the pre-processor 154 is removed from the configuration example of FIG. 5(a). In this configuration example, the pre-processor 152 is always used. In the configuration example of FIG. 5(c), the part of the encoding unit 105 includes the pre-processor 154 and the encoder 155. Moreover, in the configuration example of FIG. 5(d), the part of the encoding unit 105 includes only the encoder 155.

Figure 6:
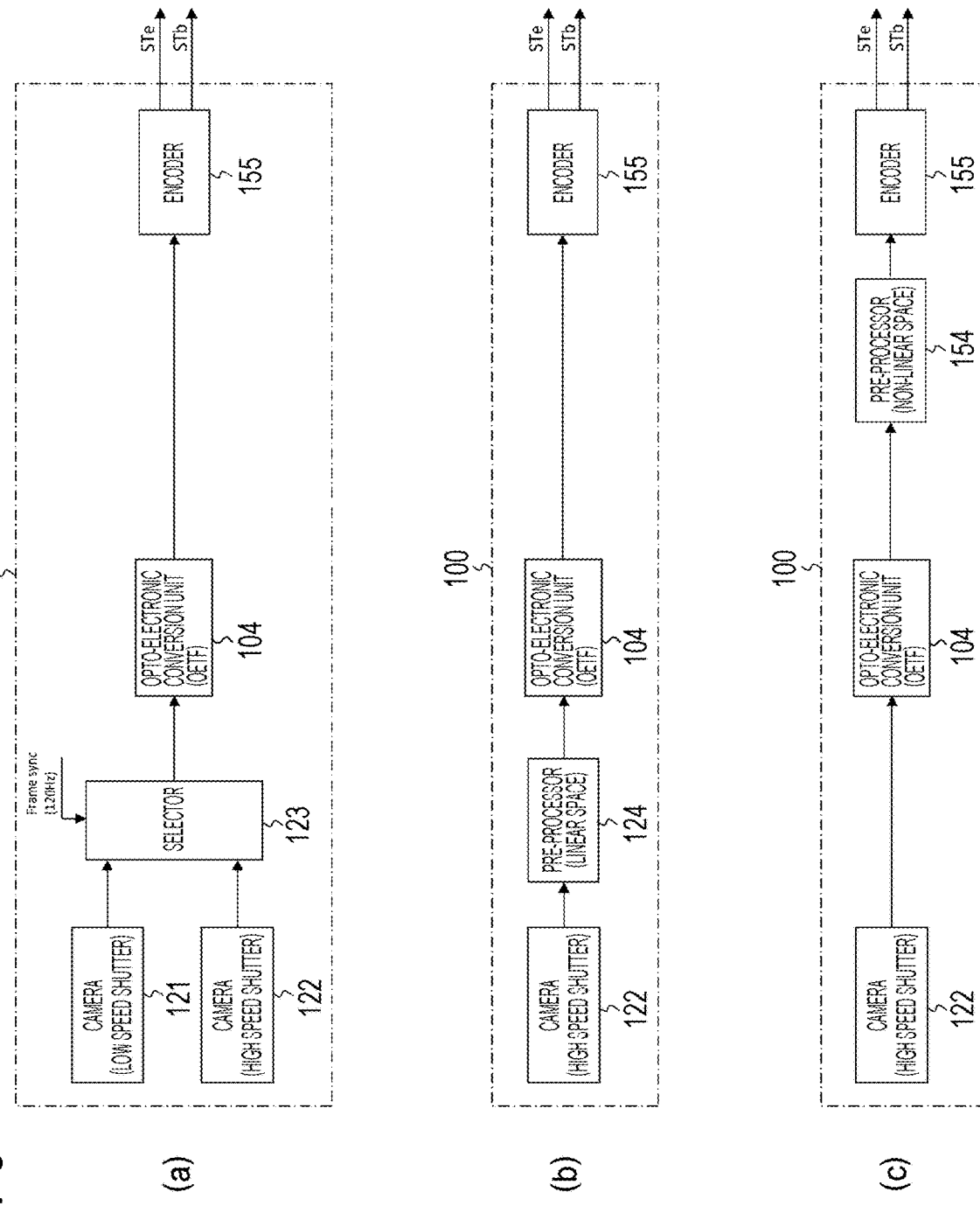
FIG. 6 is a block diagram illustrating specific configuration examples of the transmission device.

In a case where the part of the camera 102 and the HFR processing unit 103 employs the configuration of FIG. 4(a), the part of the encoding unit 105 employs the configuration of FIG. 5(d). Therefore, in this case, the transmission device 100 has a configuration as illustrated in FIG. 6(a). In this case, the mixing process is performed in the linear space.

Further, in a case where the part of the camera 102 and the HFR processing unit 103 employs the configuration of FIG. 4(b), the part of the encoding unit 105 employs the configuration of FIG. 5(d). Therefore, in this case, the transmission device 100 has a configuration as illustrated in FIG. 6(b). In this case, the mixing process is performed in the linear space.

Further, in a case where the part of the camera 102 and the HFR processing unit 103 employs the configuration of FIG. 4(c), the part of the encoding unit 105 employs one of the configurations of FIGS. 5(a) to 5(c). In a case where the configuration of FIG. 5(c) is employed, the transmission device 100 has a configuration as illustrated in FIG. 6(c). In this case, the mixing process is performed in the non-linear space.

Figure 7:
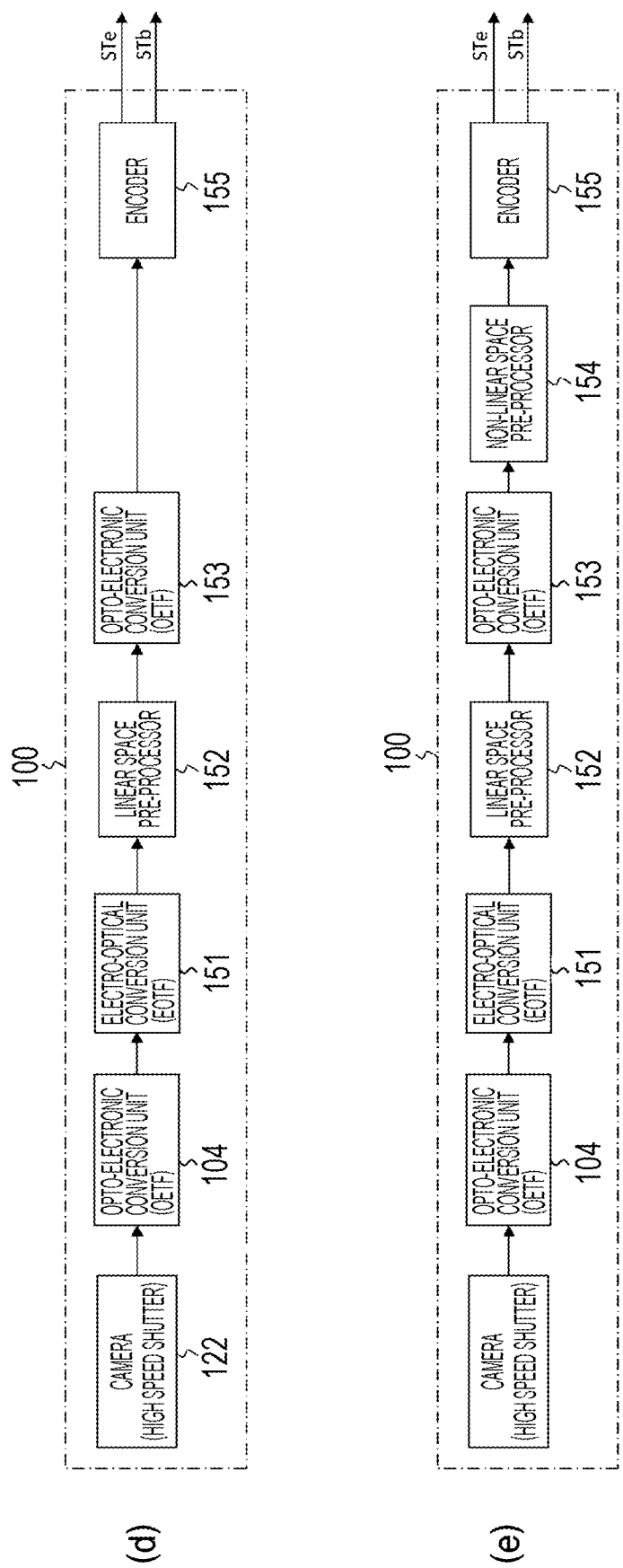
FIG. 7 is a block diagram illustrating specific configuration examples of the transmission device.

Further, in a case where the configuration of FIG. 5(b) is employed, the transmission device 100 has a configuration as illustrated in FIG. 7(d). In this case, the mixing process is performed in the linear space. Further, in a case where the configuration of FIG. 5(a) is employed, the transmission device 100 has a configuration as illustrated in FIG. 7(e). In this case, the mixing process is selectively performed in the linear space or the non-linear space.

Figure 8:
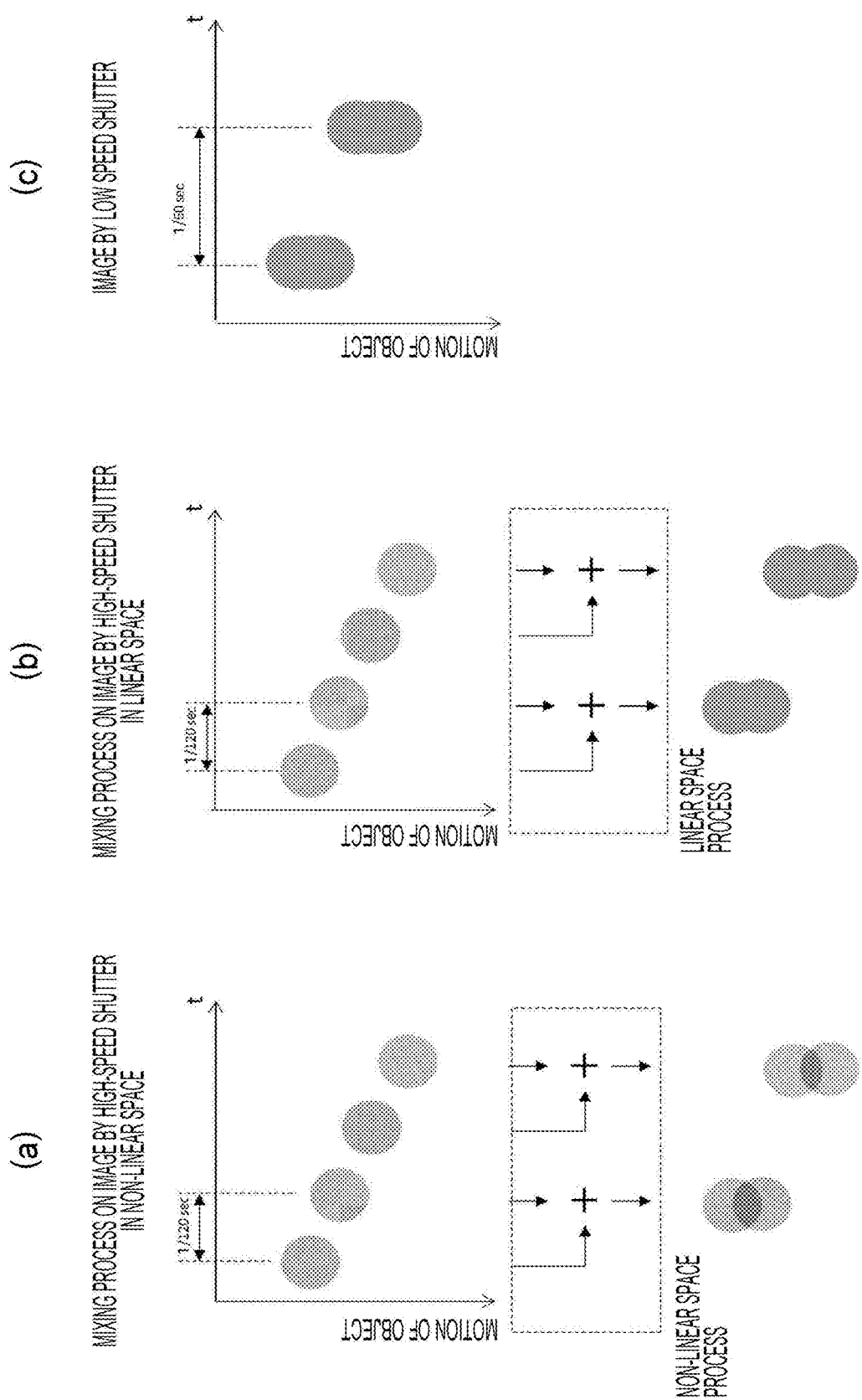
FIG. 8 is a diagram for explaining a mixing process in a non-linear space and a linear space.

FIG. 8(a) conceptually illustrates a case where the mixing process is performed on 120 Hz images by the high-speed shutter camera in the non-linear space. In the illustrated example, four "0" indicate motions of an object in four consecutive pictures. By performing the mixing process in units of two temporally consecutive pictures, the objects in two pictures are in a deviated state and overlapped.

FIG. 8(b) conceptually illustrates a case where the mixing process is performed on 120 Hz images by the high-speed shutter camera in the linear space. In the illustrated example, four "0" indicate motions of an object in four consecutive pictures. By performing the mixing process in units of two temporally consecutive pictures, the objects in two pictures are in a deviated state and overlapped. In this case, the state is different from that when the mixing process is performed in the non-linear space.

FIG. 8(c) conceptually illustrates an image at 60 Hz by the low speed shutter camera. In the illustrated example, the object in each picture is in a state equivalent to the case where the mixing process is performed on 120 Hz images by the high-speed shutter camera in the linear space with the mixing ratio of 1:1.

Figure 9:
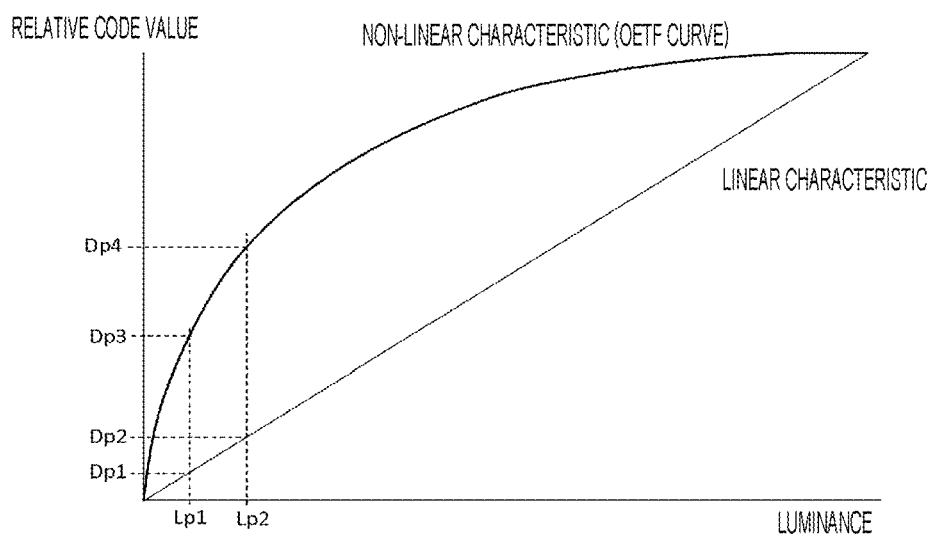
FIG. 9 is a diagram illustrating an example of a linear characteristic and a non-linear characteristic (OETF curve) for converting luminance into a coded value.

Next, merits of the mixing process in the linear space will be described. FIG. 9 illustrates an example of a linear characteristic and a non-linear characteristic (OETF curve) for converting luminance into a code value. Note that the code value in a case of being converted by the linear characteristic is represented by, for example, 16 bits, whereas the code value in a case of being converted by the non-linear characteristic is represented by, for example, 10 bits, and the maximum of each code value is usually different. However, in the illustrated example, the maximums of the respective code values are normalized so that they coincide with each other.

A relative code value for a luminance range (Lp1 to Lp2) in which the mixing target is luminance in the low frequency range is Dp1 to Dp2 in the case by the linear characteristic, but Dp3 to Dp4 in the case by the non-linear characteristic. As is clear from the diagram, (Dp2−Dp1)<(Dp4−Dp3). The luminance difference in the low frequency range is small in the linear space, but is large in the non-linear space. If there is a large amount of change in texture in the mixing target, the large change is reflected after mixing. On the other hand, in the linear space, the amount of change in the mixing target is relatively small, the change after mixing becomes relatively small, and the object that has moved becomes close to the physical phenomenon actually seen by the eyes as a motion blur.

FIG. 10(a) illustrates an example of the mixing process in the non-linear space. The "non-linear conversion" corresponds to conversion with the non-linear characteristic illustrated in FIG. 9. FIG. 10(b) illustrates an example of the mixing process in the linear space. The "linear conversion" corresponds to conversion with the linear characteristic of FIG. 9.

Figure 10:
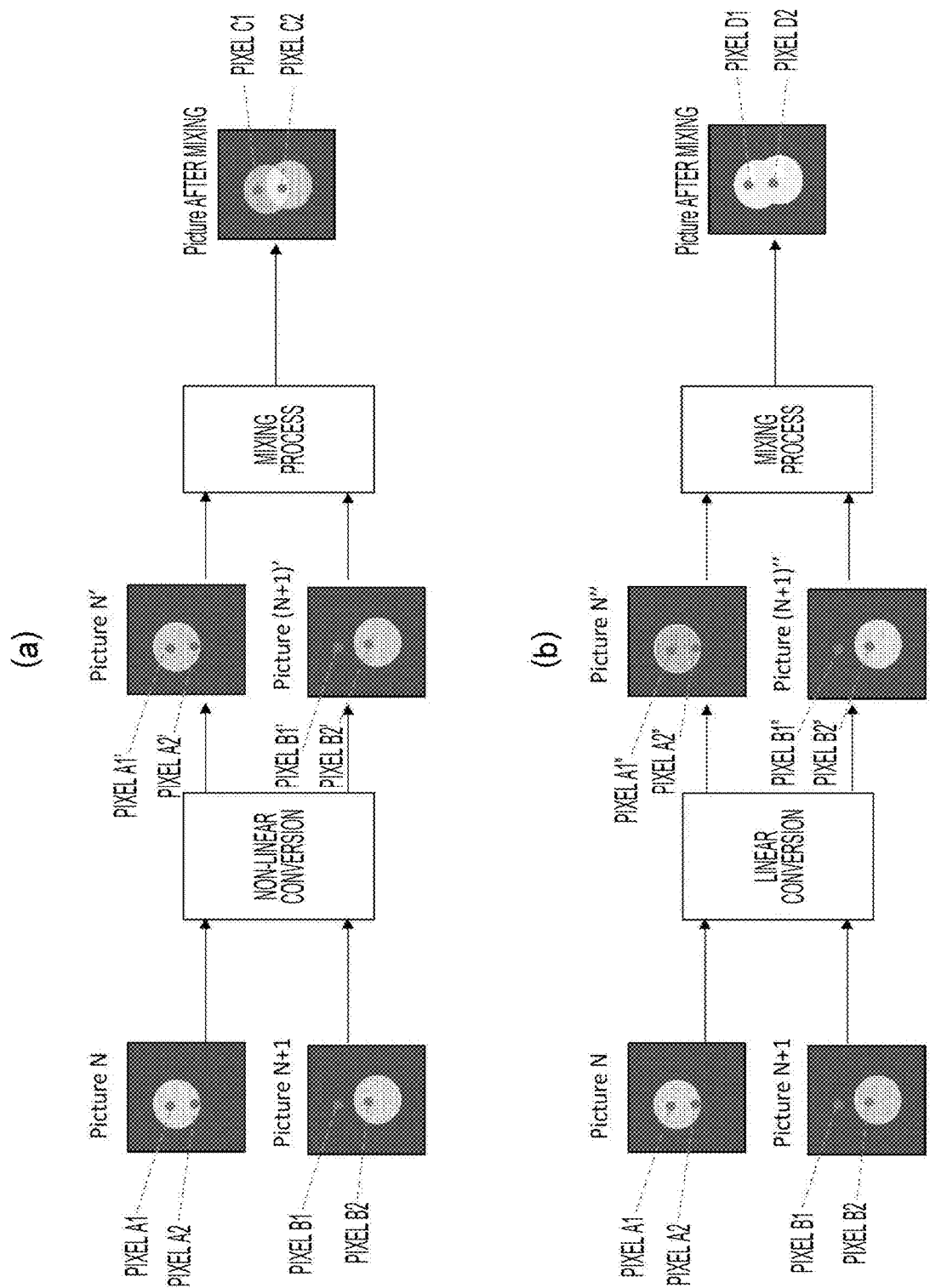
FIG. 10 is a diagram illustrating examples of the mixing process in the non-linear space and the linear space.

In FIG. 10, pixels A1 and A2 are pixels forming a camera-captured picture N, and pixels B1 and B2 are pixels forming a camera-captured picture N+1. Further, pixels C1 and C2 are pixels that form a picture after mixing. Furthermore, pixels A1, B1, A1', B1', A1", B1", C1, and D1 are at the same pixel position in each picture. Similarly, A2, B2, A2', B2', A2", B2", C2, and D2 are at the same pixel position in each picture. For example, it is assumed that values of A1 and A2 of the picture N are Lp2, a value of B2 of the picture N+1 is Lp2, and a value of B1 of the picture N+1 is Lp1.

In the mixing process in the non-linear space of FIG. 10(a), the picture N and the picture N+1 are each non-linearly converted to obtain a picture N' and a picture (N+1)'. Values of A1' and A2' are Dp4, a value of B1' is Dp3, and a value of B2' is Dp4. C1 is a mixed result of A1' and B1', and a value thereof is (Dp4 (+) Dp3). Note that here, "(+)" means a mixing operation. Further, C2 is a mixed result of A2' and B2', and a value thereof is Dp4.

On the other hand, in the mixing process in the linear space of FIG. 10(b), each of the picture N and the picture N+1 is linearly converted to obtain a picture N" and a picture (N+1)". Values of A1" and A2" are Dp2, a value of B1" is Dp1, and a value of B2" is Dp2. D1 is a mixed result of A1" and B1", and a value thereof is (Dp2 (+) Dp1). Further, D2 is a mixed result of A2" and B2", and a value thereof is Dp2.

A value of C1 is between Dp3 and Dp4 and a value of D1 is between Dp1 and Dp2. When comparing the set of C1 and C2 with the set of D1 and D2, the difference between C1 and C2 is larger than the difference between D1 and D2. Note that this can be said when the target portion has low luminance. In a case where the target portion has high luminance, it is considered that the opposite phenomenon is visually inconspicuous because the luminance value is high.

In a case of expressing a smooth motion, in the picture after mixing, the smaller the difference between the mixed values, the more natural the motion blur appears, and in the case of the content where the difference between the mixed values is prominent, there is an advantage of choosing the mixing process in the linear space.

Figure 11:
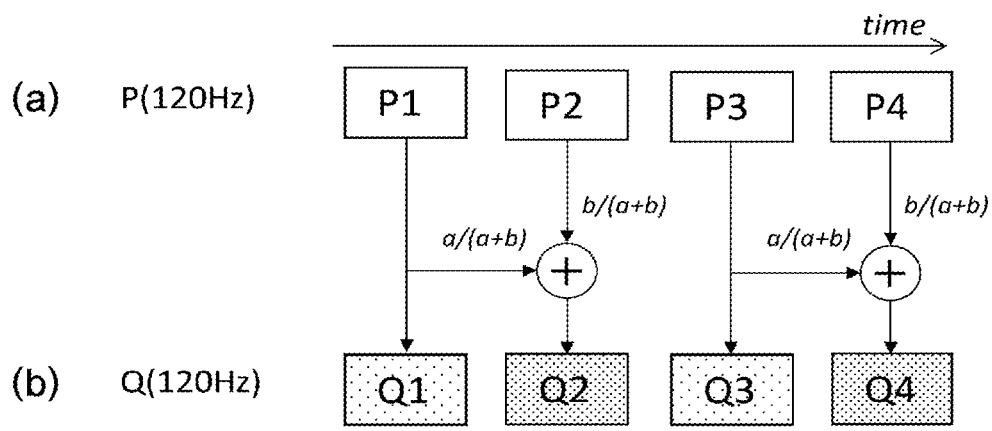
FIG. 11 is a diagram schematically representing a relationship between 120 Hz image data P input to a pre-processor and 120 Hz image data Q output from the pre-processor.

FIG. 11 schematically represents the relationship between 120 Hz image data P input to a pre-processor 160 (pre-processors 124, 152, 154) and 120 Hz image data Q output from the pre-processor 160. FIG. 11(a) illustrates the image data P, and FIG. 11(b) illustrates the image data Q. Corresponding to the image data P1, P2, P3, P4, . . . of respective pictures of the 120 Hz image data P, image data Q1, Q3, . . . of respective pictures of the enhanced layer, and image data Q2, Q4, . . . of respective pictures of the base layer having subjected to the mixing process are obtained. Note that in FIG. 11, a and b are coefficients representing the mixing ratio.

Figure 12:
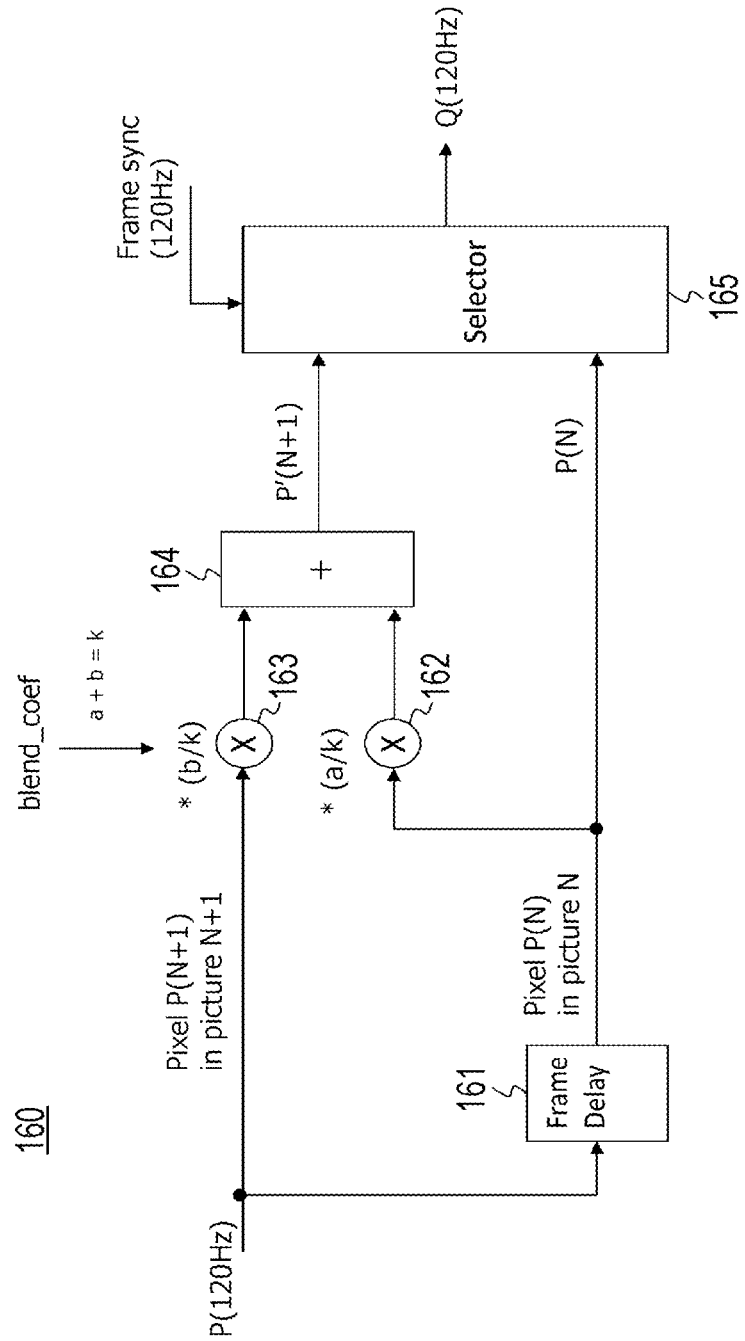
FIG. 12 is a diagram illustrating a configuration example of the pre-processor.

FIG. 12 illustrates a configuration example of the pre-processor 160 (pre-processors 124, 152, 154). The pre-processor 160 has a frame delay unit 161, coefficient units 162 and 163, an addition unit 164, and a selector 165.

The image data P is supplied to the coefficient unit 163 and the frame delay unit 161. The frame delay unit 161 gives the input image data P a delay of one frame at 120 Hz. Output image data of the frame delay unit 161 is supplied to the coefficient unit 162. Here, when the input is image data P(N+1) of a picture "N+1", the output of the frame delay unit 161 is image data P(N) of a picture "N".

A coefficient of (a/k) is given to the coefficient unit 162, and the image data P(N) is multiplied by this coefficient. Further, a coefficient of (b/k) is given to the coefficient unit 163, and the image data P(N+1) is multiplied by this coefficient. Output values of the coefficient units 162 and 163 are supplied to the addition unit 164. Here, the coefficient units 162 and 163 and the addition unit 164 form a filter for performing the mixing process, and the addition unit 164 obtains image data P' (N+1) having subjected to the mixing process.

The image data P(N) obtained by the frame delay unit 161 and the image data P' (N+1) obtained by the addition unit 164 are supplied to the selector 165. The selector 165 alternately extracts the image data P(N) and the image data P' (N+1) in 120 Hz frame units, and outputs them as 120 Hz image data Q.

Referring back to FIG. 3, as described above, the encoding unit 105 obtains the base stream STb and the enhanced stream STe (see FIG. 5). The base stream STb and the enhanced stream STe thus obtained are transmitted from the transmission device 100 to the television receiver 200 by being included in the transport stream TS as the container.

In this case, the processing space information and the mixing processing information are inserted in the layer of the stream (base stream, enhanced stream) and/or the layer of the container as information necessary for performing the inverse mixing process on the reception side. The processing space information indicates whether the mixing process is performed in the linear space or the non-linear space. Further, the mixing process information includes information on the mixing ratio in the mixing process, information indicating the temporal relative positional relationship between one picture (picture of the enhanced layer) and the other picture (picture of the base layer) in units of two consecutive pictures, and the like.

The television receiver 200A having a decoding capability capable of processing 120 Hz (high frame rate) image data and having the inverse mixing process function includes a decoding unit 201, an electro-optical conversion unit 202, an HFR processing unit 203, and a display unit 204. The electro-optical conversion unit 202 applies the electro-optical conversion characteristic (EOTF curve) to convert the input image data from the non-linear space to the linear space, and outputs the converted data. The display unit 204 displays an image by the 120 Hz image data obtained by the HFR processing unit 203.

Figure 13:
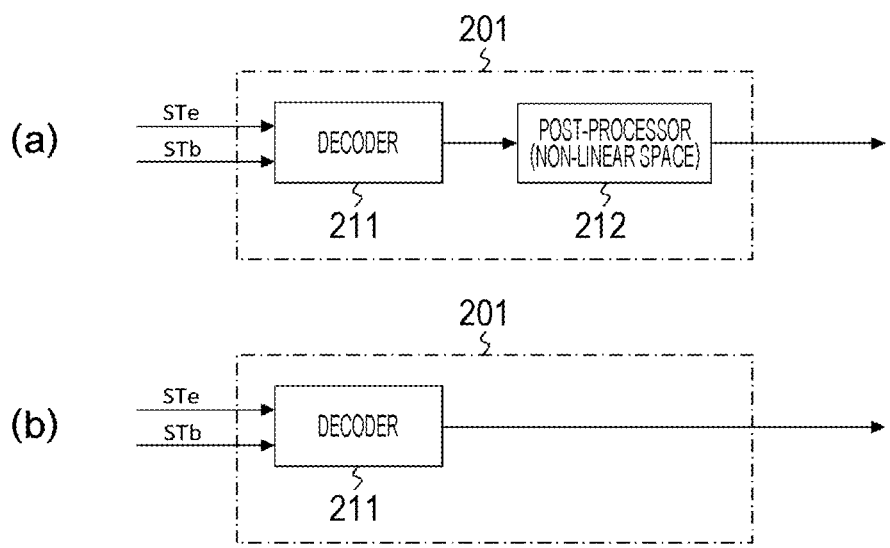
FIG. 13 is a diagram illustrating specific configuration examples of a part of a decoding unit.

FIGS. 13(a) and 13(b) illustrate specific configuration examples of a part of the decoding unit 201. In the configuration example of FIG. 13(a), the part of the decoding unit 201 includes a decoder 211 and a post-processor 212. The decoder 211 decodes the base stream STb and the enhanced stream STe to obtain output image data. Here, the output image data alternately changes to image data of non-mixed pictures and image data of mixed pictures in units of 120 Hz frames. The image data of the non-mixed picture forms the image data of each picture of the enhanced layer, and the image data of the mixed picture forms the image data of each picture of the base layer.

The post-processor 212 performs the inverse mixing process on the output image data of the decoder 211 on the basis of the mixing process information to release the mixed state of the image data of each picture of the base layer, and obtains 120 Hz (high frame rate) image data formed by the image data of each picture of the base layer and the enhanced layer. In this case, the image data is in the non-linear space, and the inverse mixing process in the post-processor 212 is performed in the non-linear space.

In the configuration example of FIG. 13(b), the part of the decoding unit 201 is formed only by the decoder 211. In this case, output image data as it is of the decoder 211 becomes an output of the part of the decoding unit 201.

Figure 14:
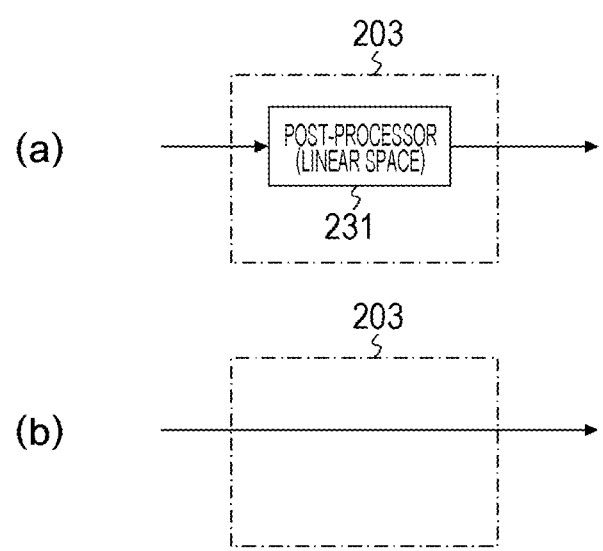
FIG. 14 is a diagram illustrating specific configuration examples of a part of the HFR processing unit.

FIGS. 14(a) and 14(b) illustrate specific configuration examples of the part of the HFR processing unit 203. In the configuration example of FIG. 14(a), the part of the HFR processing unit 203 only includes the post-processor 231. The post-processor 231 performs the inverse mixing process on the input image data on the basis of the mixing process information to release the mixed state of the image data of each picture of the base layer, and obtains 120 Hz (high frame rate) image data formed by the image data of each picture of the base layer and the enhanced layer. In this case, the image data is in the linear space, and the inverse mixing process in the post-processor 231 is the one performed in the linear space.

In the configuration example of FIG. 14(a), the part of the HFR processing unit 203 is in the through state. In this case, the input image data as it is becomes the output image data.

Figure 15:
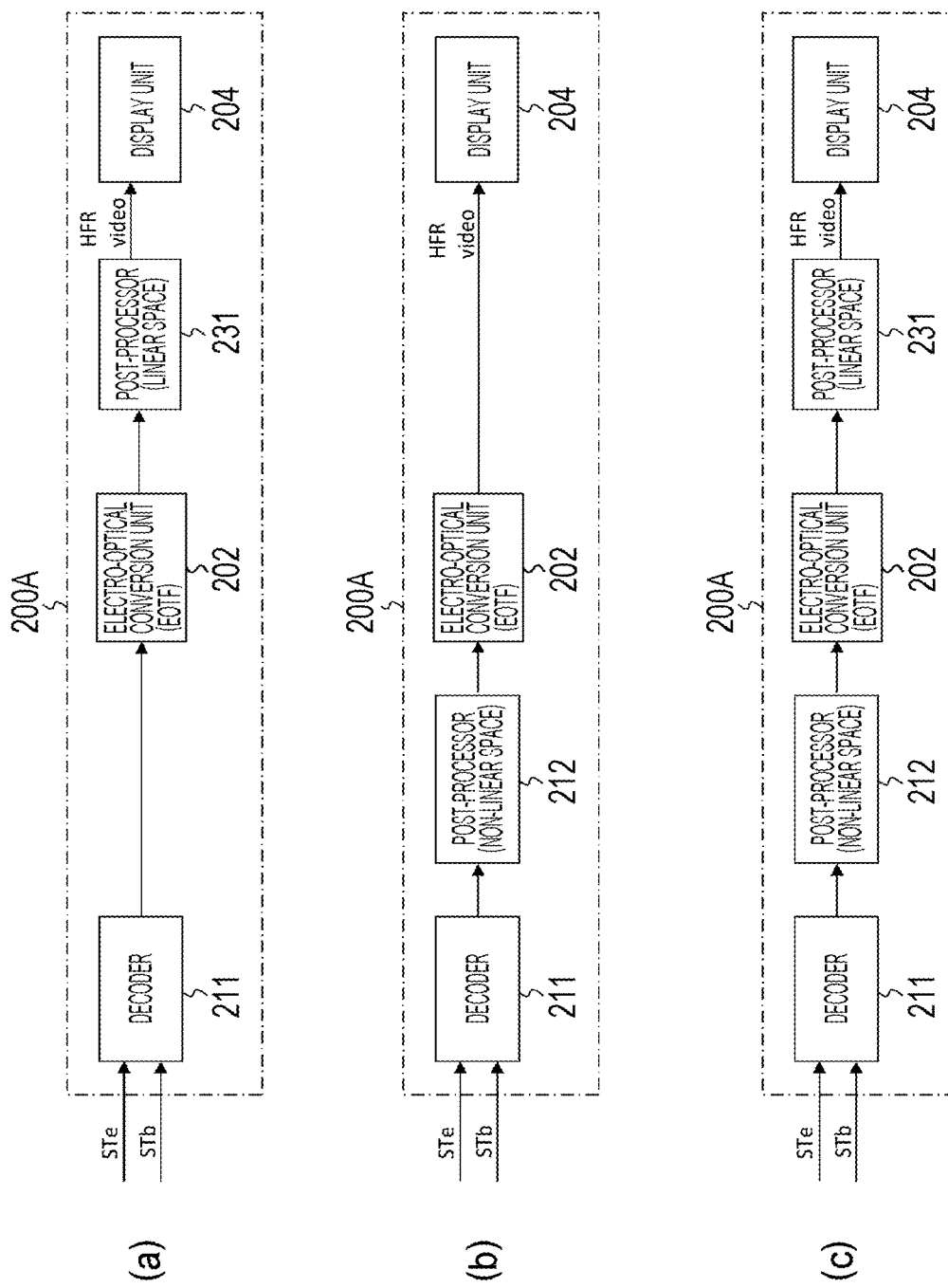
FIG. 15 is a block diagram illustrating specific configuration examples of a television receiver.

In a case where the part of the decoding unit 201 employs the configuration of FIG. 13(b), the part of the HFR processing unit 203 employs the configuration of FIG. 14(a). Therefore, in this case, the television receiver 200A has a configuration as illustrated in FIG. 15(a). In this case, the inverse mixing process is performed in the linear space.

Therefore, in this configuration, in a case where the image data of each picture of the base layer included in the base stream STb transmitted from the transmission device 100 has been subjected to the mixing process in the non-linear space, the post-processor 231 does not perform the inverse mixing process, and the input image data is output as it is.

In this case, the display unit 204 displays the image having been subjected to the mixing process in every frame. However, in a case where the mixing process is performed at a mixing ratio with which the effect of the image having been subjected to the mixing process is minimized without releasing the mixing on the transmission side, image quality reduction is suppressed. The mixing ratio in this case is, for example, a:b=1:4.

Further, in a case where the part of the decoding unit 201 employs the configuration of FIG. 13(a), the part of the HFR processing unit 203 employs either of the configurations of FIGS. 14(a) and 14(b). In a case where the configuration of FIG. 14(b) is employed, the television receiver 200A has a configuration as illustrated in FIG. 15(b). In this case, the inverse mixing process is performed in the non-linear space.

Therefore, in this configuration, in a case where the image data of each picture of the base layer included in the base stream STb transmitted from the transmission device 100 has been subjected to the mixing process in the linear space, the post-processor 212 does not perform the inverse mixing process, and the input image data is output as it is.

In this case, the display unit 204 displays the image having been subjected to the mixing process in every frame. However, in a case where the mixing process is performed at a mixing ratio with which the effect of the image having been subjected to the mixing process is minimized without releasing the mixing on the transmission side, image quality reduction is suppressed. The mixing ratio in this case is, for example, a:b=1:4.

Further, when the configuration of FIG. 14(a) is employed, the television receiver 200A has a configuration as illustrated in FIG. 15(c). In this case, the inverse mixing process is selectively performed in the non-linear space or the linear space. Therefore, in this configuration, in a case where the image data of each picture of the base layer included in the base stream STb transmitted from the transmission device 100 has been subjected to the mixing process in either the linear space or the non-linear space, it is possible to perform the inverse mixing process.

Figure 16:
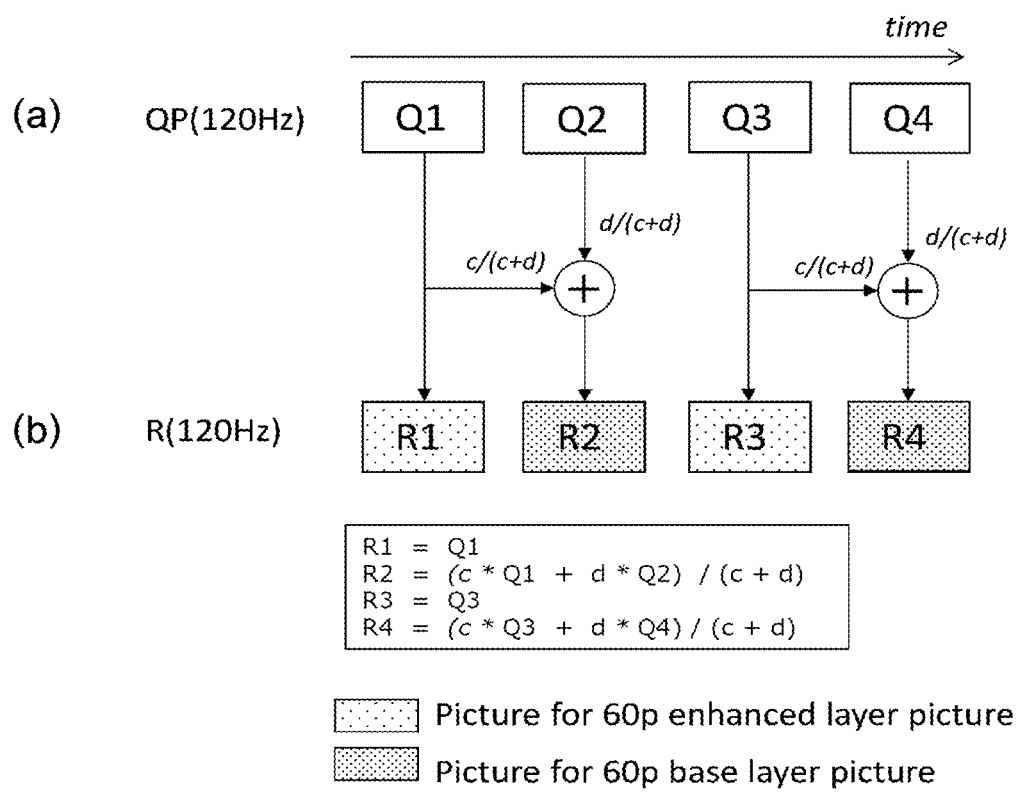
FIG. 16 is a diagram schematically representing a relationship between 120 Hz image data Q input to a post-processor and 120 Hz image data R output from the post-processor.

FIG. 16 schematically represents the relationship between 120 Hz image data Q input to a post-processor 240 (pre-processors 212, 231) and 120 Hz image data R output from the post-processor 240. FIG. 16(a) illustrates the image data Q, and FIG. 16(b) illustrates the image data R. Corresponding to the image data Q1, Q2, Q3, Q4, . . . of each picture of the 120 Hz image data Q, image data R1, R3, . . . of each picture of the enhanced layer and image data R2, R4, . . . of each picture of the base layer released from mixing are obtained. Note that in FIG. 16, c and d are coefficients for releasing the mixing. Here, c=−a/b and d=(a+b)/b. Note that a and b are coefficients that represent the mixing ratio (see FIG. 11).

Figure 17:
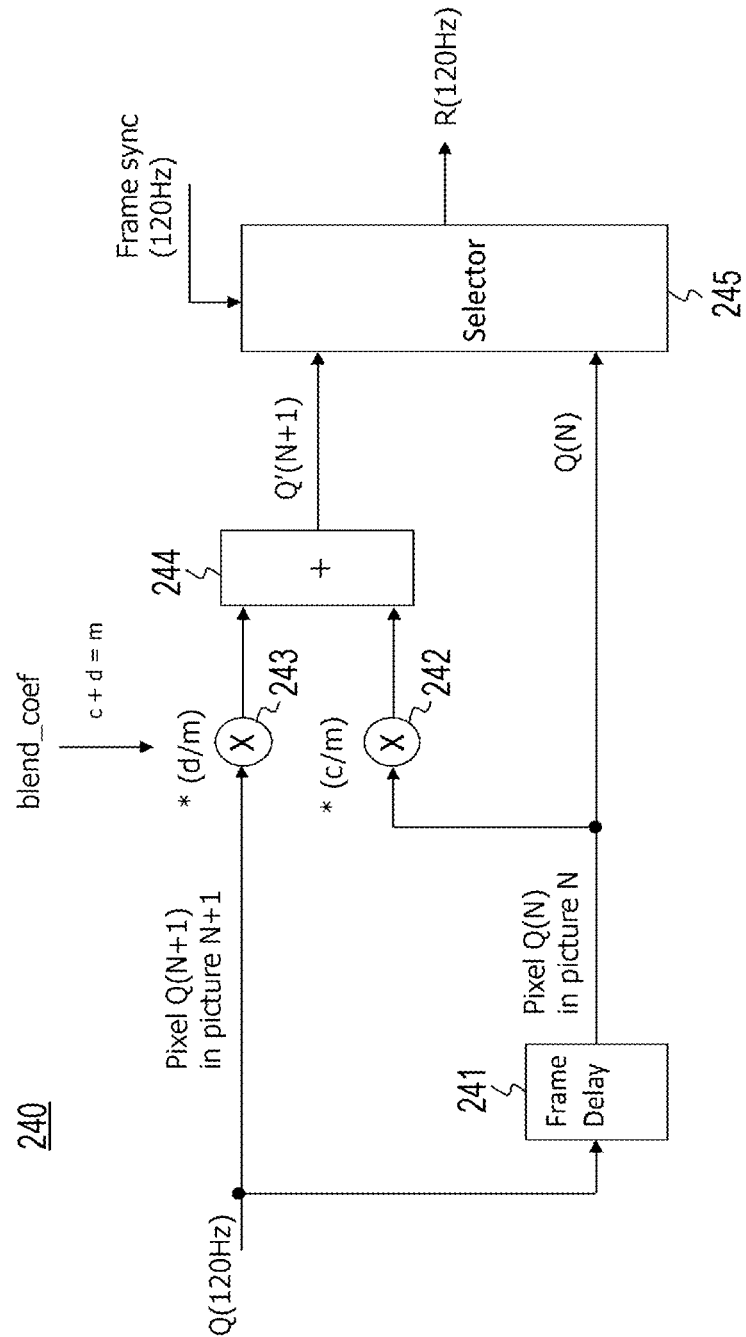
FIG. 17 is a diagram illustrating a configuration example of the post-processor.

FIG. 17 illustrates a configuration example of the post-processor 240 (pre-processors 212, 231). The post-processor 240 has a frame delay unit 241, coefficient units 242 and 243, an addition unit 244, and a selector 245.

The image data Q is supplied to the coefficient unit 243 and the frame delay unit 241. The frame delay unit 241 gives the input image data Q a delay of one frame at 120 Hz. The output image data of the frame delay unit 241 is supplied to the coefficient unit 242. Here, when the input is image data Q(N+1) of the picture "N+1", the output of the frame delay unit 241 is image data Q(N) of the picture "N".

A coefficient of (c/m) is given to the coefficient unit 242, and the image data Q(N) is multiplied by this coefficient. Further, a coefficient of (d/m) is given to the coefficient unit 243, and the image data Q(N+1) is multiplied by this coefficient. Output values of the coefficient units 242 and 243 are supplied to the addition unit 244. Here, the coefficient units 242 and 243 and the addition unit 244 form a filter for performing the mixing process, and the addition unit 244 obtains the image data Q' (N+1) released from mixing.

The image data Q(N) obtained by the frame delay unit 241 and the image data Q' (N+1) obtained by the addition unit 244 are supplied to the selector 245. The selector 245 alternately takes out the image data Q(N) and the image data Q' (N+1) in 120 Hz frame units, and outputs them as 120 Hz image data R.

Referring back to FIG. 3, the television receiver 200B having a decoding capability capable of processing 120 Hz (high frame rate) image data and does not have an inverse mixing process function includes a decoder 211B, an electro-optical conversion unit 202B, and a display unit 204B.

The decoder 211B decodes the base stream STb and the enhanced stream STe to obtain output image data. Here, the output image data alternately changes to image data of non-mixed pictures and image data of mixed pictures in units of 120 Hz frames. The image data of the non-mixed picture forms the image data of each picture of the enhanced layer, and the image data of the mixed picture forms the image data of each picture of the base layer.

The electro-optical conversion unit 202B applies the electro-optical conversion characteristic (EOTF curve) to convert the input image data from the non-linear space to the linear space and outputs the converted data. The display unit 204B displays an image by the 120 Hz image data output from the electro-optical conversion unit 202B. In this case, the display unit 204B displays the image having been subjected to the mixing process in every frame. However, in a case where the mixing process is performed at a mixing ratio with which the effect of the image having been subjected to the mixing process is minimized without releasing the mixing on the transmission side, image quality reduction is suppressed. The mixing ratio in this case is, for example, a:b=1:4.

Further, the television receiver 200C having a decoding capability capable of processing 60 Hz (normal frame rate) image data includes a decoder 211C, an electro-optical conversion unit 202C, and a display unit 204C.

The decoder 211C decodes the base stream STb to obtain 60 Hz output image data. The electro-optical conversion unit 202C applies the electro-optical conversion characteristic (EOTF curve) to convert the input image data from the non-linear space to the linear space and output the converted data. The display unit 204C displays an image by the 120 Hz image data output from the electro-optical conversion unit 202C. In this case, since the image data of each picture in the base layer has been subjected to the mixing process, a favorable image with reduced strobing is displayed.

"Configuration of Transmission Device"

Figure 18:
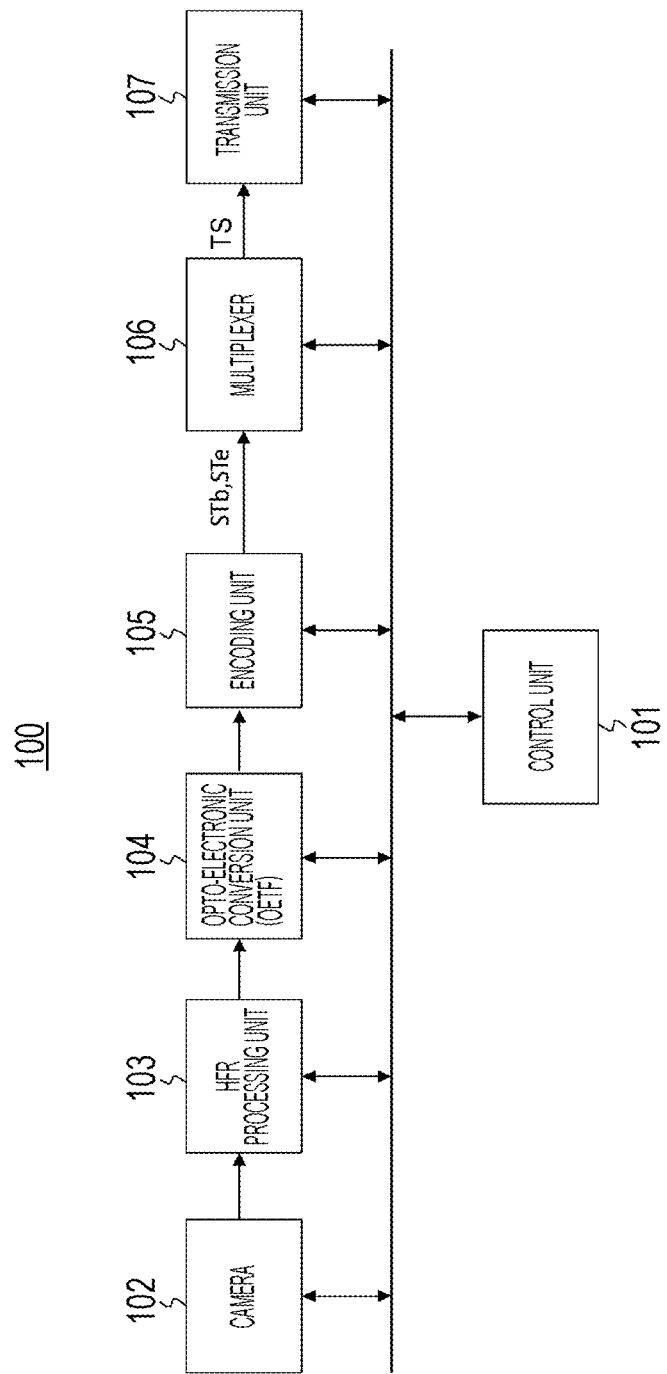
FIG. 18 is a diagram illustrating a configuration example of the transmission device.

FIG. 18 illustrates a configuration example of the transmission device 100. This transmission device 100 has a control unit 101, the camera 102, the HFR processing unit 103, the opto-electronic conversion unit 104, the encoding unit 105, a multiplexer 106, and a transmission unit 107. The control unit 101 controls operation of each unit of the transmission device 100.

The parts of the camera 102, the HFR processing unit 103, the opto-electronic conversion unit 104, and the encoding unit 105 are configured similarly to those described in FIG. 3 above, and in the encoder 155 (see FIG. 5) of the encoding unit 105, a base stream STb and an enhanced stream STe are obtained.

Here, the base stream STb is obtained by performing the mixing process in units of two temporally consecutive pictures in the 120 Hz image data to obtain image data of each picture of this base layer, and encoding the image data of each picture of this base layer with, for example, H.264/AVC, H.265/HEVC, or the like, and the mixing process is performed in the linear space or the non-linear space. Further, the enhanced stream STe is obtained by extracting image data of one picture in units of two temporally consecutive pictures to obtain image data of each picture of the enhanced layer, and encoding the image data of each picture of this enhanced layer with, for example, H.264/AVC, H.265/HEVC, or the like.

"Selection of Linear Space or Non-Linear Space, and Selection of Mixing Ratio"

Selection of whether to perform the mixing process in the linear space or the non-linear space is performed in consideration of, for example, naturalness when the mixed image is actually viewed (Naturality) or the influence on the bit rate when the mixed image is encoded, and the like, as illustrated in FIG. 19(a).

Further, selection of the mixing ratio is performed in consideration of, for example, reduction of strobing and the degree of motion blur in a normal frame rate receiver, necessity of post-processing (inverse mixing process) in a high frame rate receiver, and the like, as illustrated in FIG. 19(b). The mixing ratio is determined depending on which is given priority.

Figure 20:
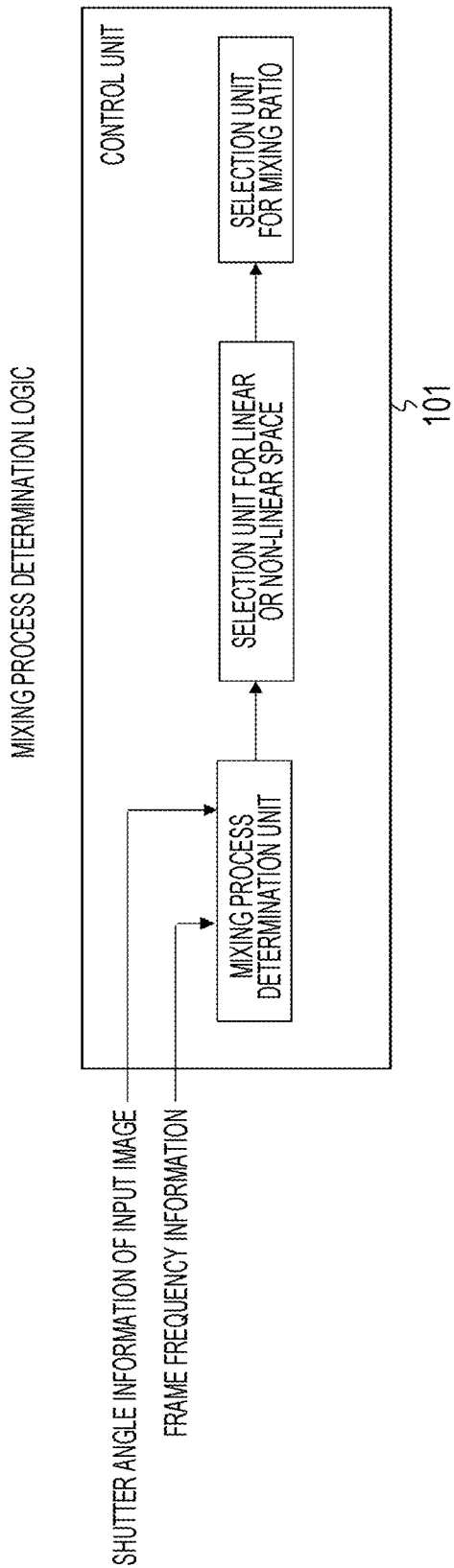
FIG. 20 is a diagram illustrating an example of a mixing process determination logic in a control unit.

FIG. 20 illustrates a mixing process determination logic in the control unit 101. The control unit 101 also has a logic of selecting whether or not to perform the mixing process depending on whether or not the shutter angle of an output image of the camera 102 is 360 degrees, in addition to the above-described logics for selecting the linear space or non-linear space and selecting the mixing ratio. In that case, the control unit 101 performs selection such that the mixing process for a base layer image is skipped when the shutter angle is 360 degrees, and the mixing process for a base layer image is performed when the shutter angle is other than 360 degrees, for example, 180 degrees.

The encoder 155 inserts the processing space information and the mixing processing information in the layer of the stream (the base stream STb or the enhanced stream STe) as information necessary for performing the inverse mixing processing on the reception side.

In this embodiment, a newly defined blending option SEI (blending_option SEI) is inserted in the part of the "SEIs" of each access unit (AU) of the enhanced stream STe or the base stream STb.

FIG. 21 illustrates a structural example (syntax) of the blending option SEI, and FIG. 22 illustrates main information contents (semantics) in the structural example. The one-bit field of "blending_flag" indicates whether or not the mixing process is performed. For example, "1" indicates that the mixing process is performed, and "0" indicates that the mixing process is not performed. When "blending_flag" is "1", there are a one-bit field of "direction_type", a one-bit field of "linear_blending_process_flag", and a four-bit field of "blending_coefficient_ratio".

When the SEI is attached to a picture of the enhanced layer, the field of "direction_type" indicates the temporal relationship of a picture of the base layer that is subjected to the mixing process with the picture of the enhanced layer. For example, "1" indicates that it is a mixing process between the picture of the enhanced layer and one subsequent picture of the base layer, and "0" indicates that it is a mixing process between the picture of the enhanced layer and one previous picture of the base layer.

On the other hand, when the SEI is attached to a picture of the base layer, the field of "direction_type" indicates the temporal relationship of a picture of the enhanced layer that is subjected to the mixing process with the picture of the base layer. For example, "1" indicates that it is a mixing process between the picture of the base layer and one subsequent picture of the enhanced layer, and "0" indicates that it is a mixing process between the picture of the base layer and one previous picture of the enhanced layer.

The field of "linear_blending_process_flag" indicates whether the mixing process is performed in the linear space or the non-linear space. For example, "1" indicates that the mixing process is performed in the linear space, and "0" indicates that the mixing process is performed in the non-linear space.

The field of "blending_coefficient_ratio" indicates a coefficient ratio (a:b) indicating a mixture ratio of two pictures before and after the mixing operation. Here, a is a coefficient for a picture of the enhanced layer, and b is a coefficient for a picture of the base layer. For example, "0" indicates 1:1, "1" indicates 1:2, "2" indicates 1:3, "3" indicates 1:4, "4" indicates 2:3, "5" indicates 3:4, "6" indicates 3:7, and "7" indicates 3:8.

Referring back to FIG. 18, the multiplexer 106 converts the base stream STb and the enhanced stream STe obtained by the encoding unit 105 into packetized elementary stream (PES) packets, and further converts them into transport packets and multiplexes them, to thereby obtain the transport stream TS as a multiplexed stream.

Further, the multiplexer 106 inserts the processing space information and the mixing processing information in the layer of the transport stream TS, which is a container, as information necessary for performing the inverse mixing processing on the reception side. In this embodiment, the multiplexer 106 inserts a blending option descriptor that is newly defined in a video elementary stream loop arranged corresponding to the enhanced stream or the base stream under a program map table.

FIG. 23 illustrates a structural example (Syntax) of the video option descriptor. The information contained in this descriptor is the same as the information contained in the above-mentioned blending option SEI (see FIG. 21), and therefore its explanation is omitted here. Note that in this embodiment, although an example is illustrated in which the blending option SEI is inserted in the layer of the stream (base stream STb or enhanced stream STe) and the blending option descriptor is inserted in the layer of the container, only the insertion of either one of them may be performed.

Figure 24:
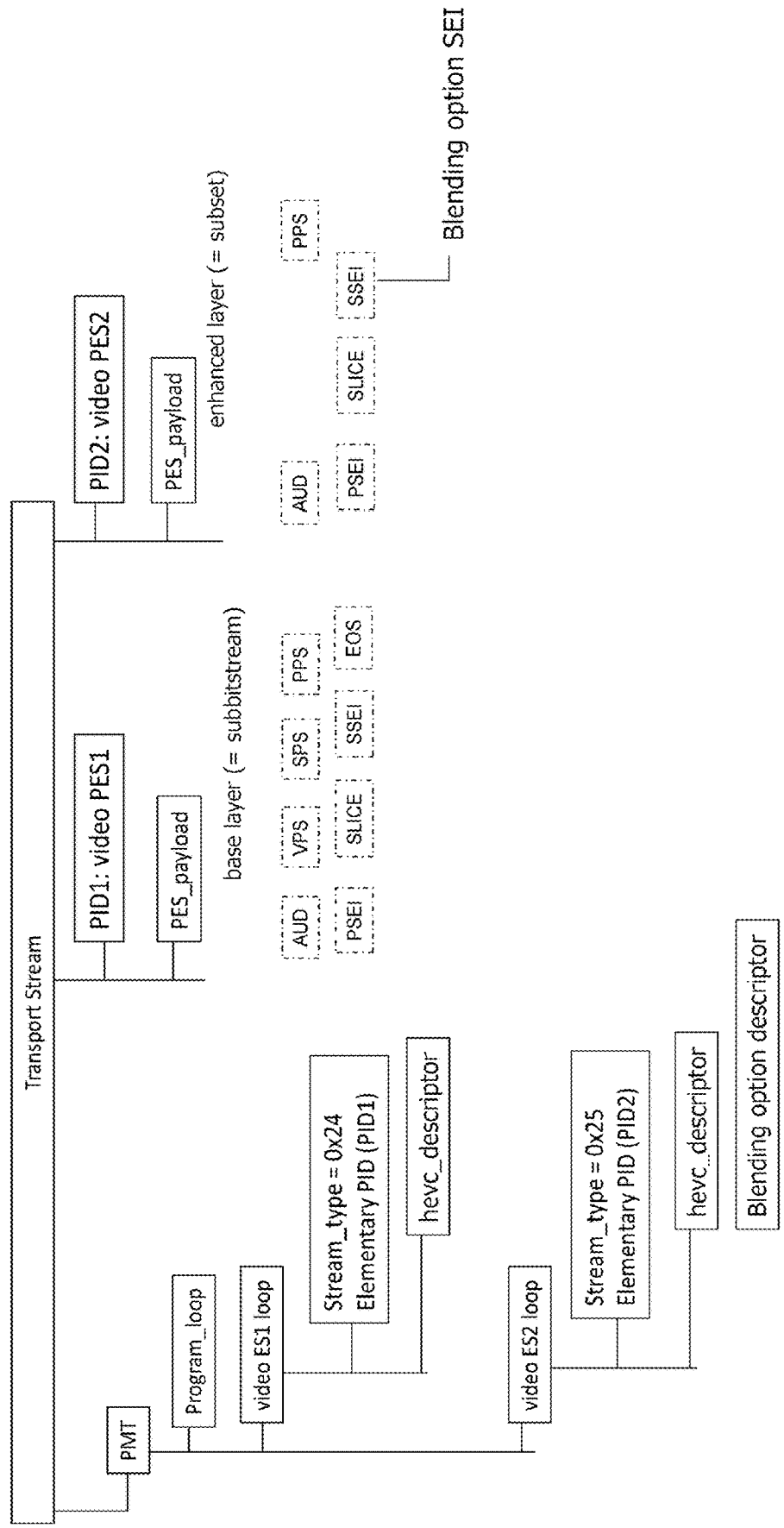
FIG. 24 is a diagram illustrating a configuration example of a transport stream TS.

FIG. 24 illustrates a configuration example of the transport stream TS. This configuration example is an example in which the blending option SEI is inserted in the layer of the enhanced stream STe. The transport stream TS includes two video streams (encoded streams), the base stream STb and the enhanced stream STe. That is, in this configuration example, the PES packet "video PES1" of the base stream STb exists and the PES packet "video PES2" of the enhanced stream STe exists. The blending option SEI (see FIG. 21) is inserted into the encoded image data of each picture that is containerized by the PES packet "video PES2".

Further, the transport stream TS includes a program map table (PMT) as one of program specific information (PSI). This PSI is information describing which program each elementary stream included in the transport stream belongs to.

In the PMT, there is a program loop that describes information related to the entire program. Further, the PMT has an elementary stream loop having information related to each video stream. In this configuration example, a video elementary stream loop "video ES1 loop" corresponding to the base stream exists and a video elementary stream loop "video ES2 loop" corresponding to the enhanced stream exists.

In the "video ES1 loop", information such as a stream type and a packet identifier (PID) is arranged corresponding to the base stream (video PES1), and a descriptor that describes information related to the video stream is also arranged. This stream type is set to "0x24" indicating the base stream.

Further, in the "video ES2 loop", information such as a stream type and a packet identifier (PID) is arranged corresponding to the enhanced stream (video PES2), and a descriptor that describes information related to the video stream is also arranged. This stream type is set to "0x25" indicating the enhanced stream. Further, a blending option descriptor (see FIG. 23) is inserted as one of the descriptors.

Figure 25:
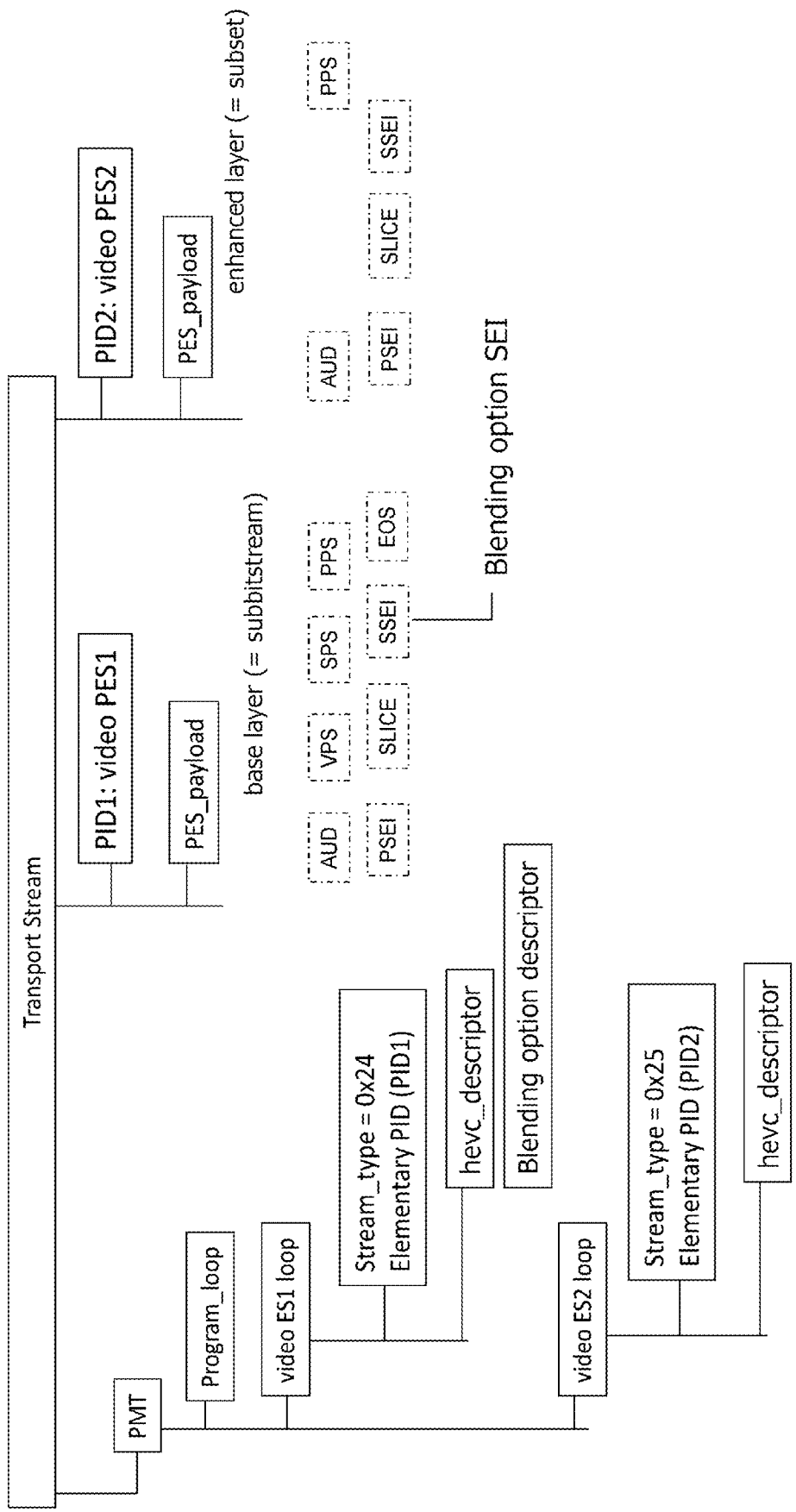
FIG. 25 is a diagram illustrating another configuration example of the transport stream TS.

FIG. 25 illustrates another configuration example of the transport stream TS. In this configuration example, the blending option SEI is inserted in the layer of the base stream STb, and accompanying this, the blending option descriptor is inserted in the "video ES1 loop". Others are similar to those of the configuration example illustrated in FIG. 24.

Referring back to FIG. 18, the transmission unit 107 modulates the transport stream TS obtained by the multiplexer 106 with, for example, a modulation method suitable for broadcasting such as QPSK/OFDM, and transmits an RF modulated signal from a transmission antenna.

"Configuration of Television Receiver"

Figure 26:
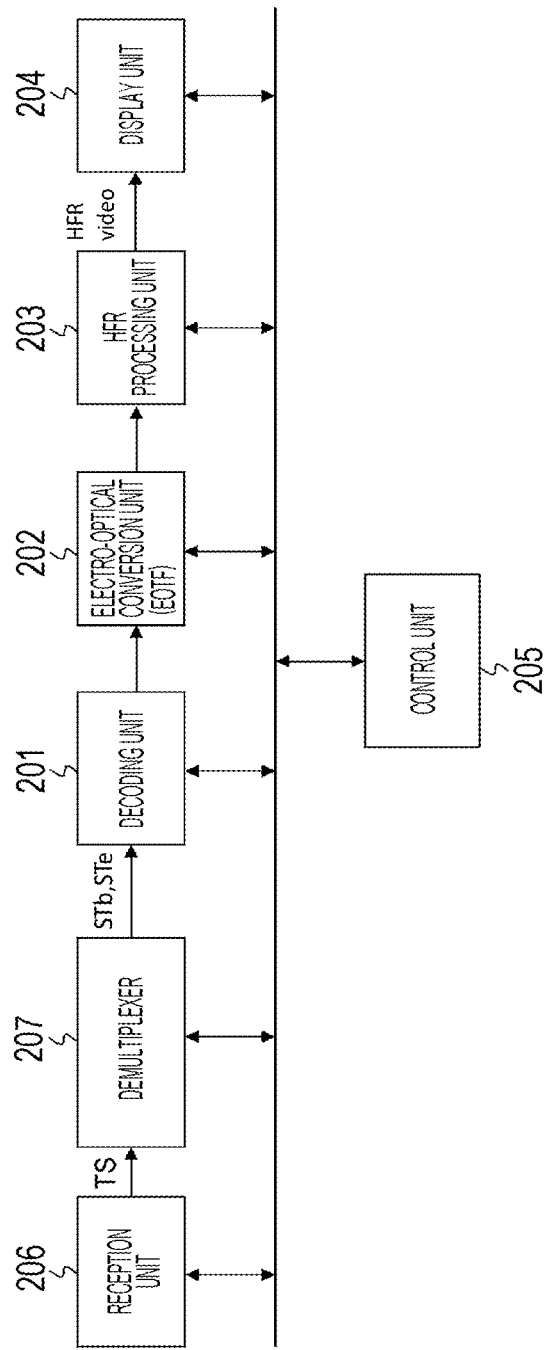
FIG. 26 is a block diagram illustrating a configuration example of a television receiver.

FIG. 26 illustrates a configuration example of a television receiver 200A having a decoding capability capable of processing 120 Hz (high frame rate) image data and having an inverse mixing process function. This television receiver 200A has a control unit 205, a reception unit 206, a demultiplexer 207, a decoding unit 201, an electro-optical conversion unit 202, an HFR processing unit 203, and a display unit 204.

The control unit 205 controls operation of each unit of the television receiver 200A. The reception unit 206 demodulates an RF modulated signal received by the reception antenna and acquires the transport stream TS. That is, the reception unit 206 receives the transport stream TS as a container through the broadcast transmission path. The demultiplexer 207 extracts the base stream STb and the enhanced stream STe from the transport stream TS by PID filtering, and supplies them to the decoding unit 201.

Further, the demultiplexer 207 also extracts section information included in the layer of the transport stream TS and sends it to the control unit 205. In this case, the blending option descriptor (see FIG. 23) is also extracted. Thus, the control unit 205 acquires the processing space information and the mixing process information.

The parts of the decoding unit 201, the electro-optical conversion unit 202, the HFR processing unit 203, and the display unit 204 are configured similarly to those described in FIG. 3 above, and in the decoder 211 of the decoding unit 201 (see FIG. 13), the base stream STb and the enhanced stream STe are decoded to obtain image data that alternately changes between image data of non-mixed pictures and image data of mixed pictures in 120 Hz frame units.

Further, the decoder 211 extracts the parameter set and SEI inserted in each access unit forming the base stream STb and the enhanced stream STe, and sends them to the control unit 205. In this case, the blending option SEI (see FIG. 21) is also extracted. Thus, the control unit 205 acquires the processing space information and the mixing process information.

Further, the decoding unit 201 or the post-processor of the HFR processing unit 203 performs the inverse mixing process on the basis of the mixing process information, and releases the mixing state of the image data of each picture in the base layer. Then, from the HFR processing unit 203, 120 Hz (high frame rate) image data including image data of each picture of the base layer and the enhanced layer is obtained. Here, the inverse mixing process is performed in the linear space or the non-linear space, but is performed in the same space as the mixing process on the transmission side on the basis of the processing space information.

Then, the 120 Hz (high frame rate) image data output from the HFR processing unit 203 is supplied to the display unit 204, and the display unit 204 displays an image by the 120 Hz image data.

Figure 27:
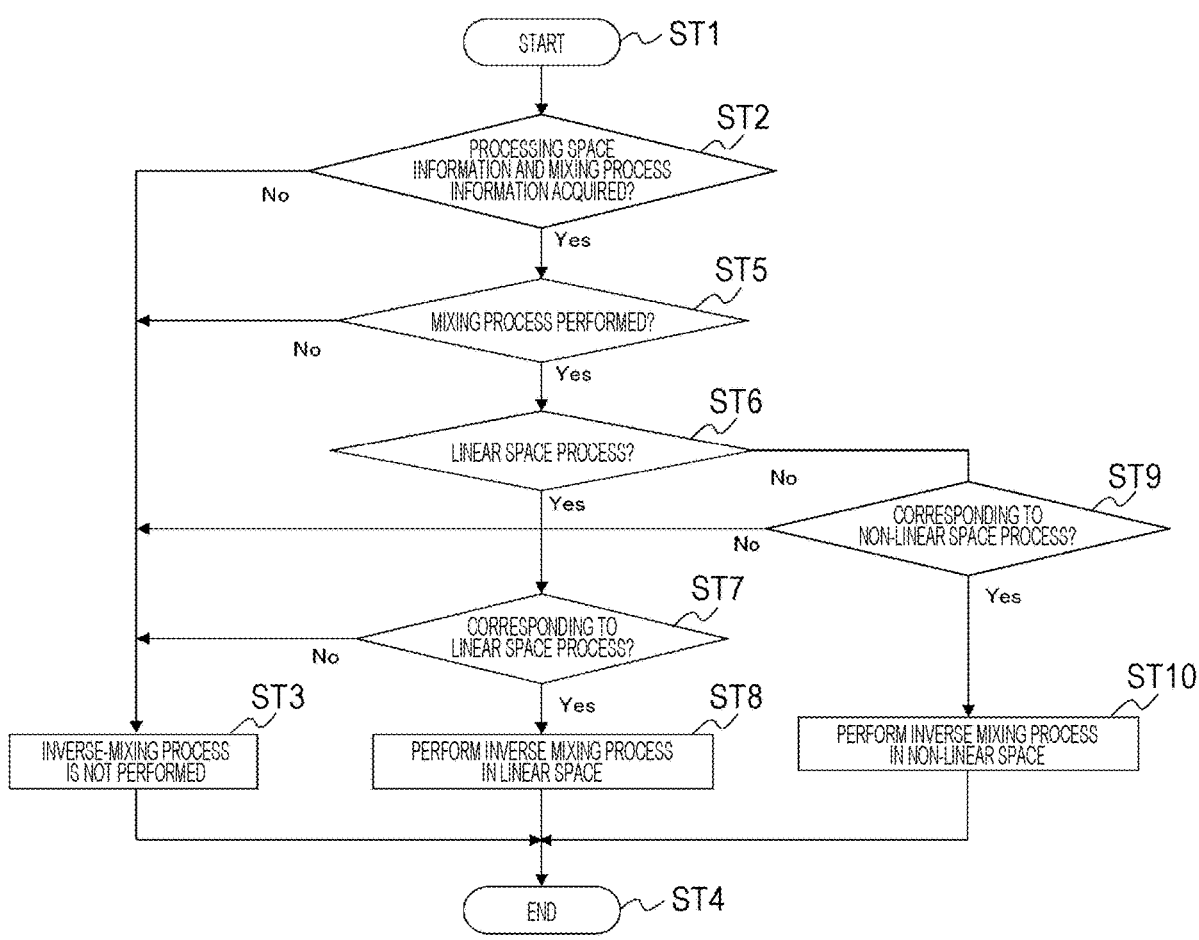
FIG. 27 is a flowchart illustrating an example of a procedure of control processing of inverse mixing in the control unit.

A flowchart of FIG. 27 illustrates an example of a procedure of control processing of the inverse mixing in the control unit 205. The control unit 205 starts the process in step ST1. Next, in step ST2, the control unit 205 determines whether or not the processing space information and the mixing process information have been acquired. When the information is not acquired, the control unit 205 controls so as not to perform the inverse mixing process in step ST3. In this case, the post-processors existing in the decoding unit 201 and the HFR processing unit 203 are in the through state in which the input image data is used as it is as the output image data. The control unit 205 ends the process in step ST4 after step ST3.

Further, when the information is acquired in step ST2, the control unit 205 determines in step ST5 whether or not the mixing processing has been performed. When the mixing process has not been performed, the control unit 205 controls so as not to perform the inverse mixing process in step ST3, and thereafter ends the process in step ST4. On the other hand, when the mixing process has been performed, the control unit 205 moves to the process of step ST6.

In step ST6, the control unit 205 determines whether or not it is a linear space process, that is, whether or not the mixing process is performed in the linear space. When it is the linear space process, the control unit 205 determines in step ST7 whether or not corresponding to the linear space process, that is, whether or not the own receiver has the inverse mixing process function in the linear space.

When corresponding to the linear space process (see FIGS. 15(a) and 15(c)), the control unit 205 performs control to perform the inverse mixing process in the linear space in step ST8. The control unit 205 ends the process in step ST4 after step ST8. On the other hand, when not corresponding to the linear space process (see FIGS. 15(b) and 15(c)), the control unit 205 performs control not to perform the inverse mixing process in step ST3, and thereafter ends the process in step ST4.

Further, in step ST6, when it is not the linear space process, that is, when the mixing process is performed in the non-linear space, the control unit 205 determines in step ST9 whether or not corresponding to the non-linear space process, that is, whether or not the own receiver has the inverse mixing process function in the non-linear space.

When corresponding to the non-linear space (see FIGS. 15(b) and 15(c)), the control unit 205 performs control to perform the inverse mixing process in the non-linear space in step ST10. The control unit 205 ends the process in step ST4 after step ST10. On the other hand, when not corresponding to the non-linear space process (see FIG. 15(a)), the control unit 205 performs control not to perform the inverse mixing process in step ST3, and thereafter ends the process in step ST4.

As described above, in the transmission-reception system 10 illustrated in FIG. 1, the image data of each picture of the base layer included in the base stream STb has been subjected to the mixing process in the linear space or the non-linear space, and in the television receiver 200A, the inverse mixing process is performed in the corresponding space on the basis of the processing space information indicating whether the mixing process is performed in the linear space or the non-linear space. Therefore, the inverse mixing process can be appropriately performed, and 120 Hz (high frame rate) image data can be accurately obtained.

3. Modification Example

Note that in the above embodiment, the processing space information and the mixing process information are inserted into the layer of the stream (the base stream STb or the enhanced stream STe) or the layer of the container and sent to the television receiver 200A. However, it is conceivable that these pieces of information are not inserted, and are recorded on, for example, a document or a removable recording medium such as a USB memory and given to the television receiver 200A side.

Further, in the above-described embodiment, an example in which the high frame rate is 120 Hz and the normal frame rate is 60 Hz is illustrated, but the combination of frame rates is not limited thereto. For example, a combination of 100 Hz and 50 Hz is similarly applied.

Further, although the example of the transmission-reception system 10 including the transmission device 100 and the television receiver 200 has been described in the above-described embodiment, the configuration of the transmission-reception system to which the present technology can be applied is not limited thereto. It is also conceivable a case where the part of the television receiver 200 is, for example, a set top box and a display connected by a digital interface such as High-Definition Multimedia Interface (HDMI). Note that "HDMI" is a registered trademark.

Further, in the above-described embodiment, the example in which the container as the multiplexed stream is the transport stream (MPEG-2 TS) has been described. However, the present technology can be similarly applied to a system configured to be distributed to reception terminals using a network such as the Internet. In the Internet distribution, it is often distributed in a container of MP4 or other formats. In other words, as the container, containers of various formats such as transport stream (MPEG-2 TS) or MPEG Media Transport (MMT) employed in the digital broadcasting standard and ISOBMFF (MP4) used in the Internet distribution are applicable.

Further, the present technology may also be configured as follows.

(1) A reception device including a reception unit that receives a container including a base stream and an enhanced stream, in which the base stream is obtained by obtaining image data of each picture of a base layer by performing a mixing process in units of two temporally consecutive pictures in image data at a predetermined frame rate, and encoding the image data of each picture of the base layer, the mixing process is performed in a linear space or a non-linear space, the enhanced stream is obtained by obtaining the image data of each picture of the enhanced layer by extracting image data of one picture in the units of two temporally consecutive pictures, and encoding the image data of each picture of the enhanced layer, the reception device further includes a processing unit that performs a process of decoding the base stream to obtain the image data of each picture of the base layer, a process of decoding the enhanced stream to obtain image data of one picture in the units of two consecutive pictures of the image data at the predetermined frame rate, which is the image data of each picture of the enhanced layer, a process of performing an inverse mixing process, which is an inverse process of the mixing process, on the image data of each picture of the base layer by using the image data of the one picture to obtain image data of the other picture in the units of two temporally consecutive pictures, and a process of combining the image data of the one picture and the image data of the other picture to obtain image data at the predetermined frame rate, and the processing unit performs the inverse mixing process in a corresponding space on the basis of processing space information indicating whether the mixing process is performed in the linear space or performed in the non-linear space.

(2) The reception device according to (1) above, in which the processing space information is inserted in a layer of the base stream or a layer of the enhanced stream.

(3) The reception device according to (2) above, in which the base stream and the enhanced stream have a NAL unit structure, and the base stream or the enhanced stream includes a NAL unit including the processing space information.

(4) The reception device according to any one of (1) to (3) above, in which the processing space information is inserted in a layer of the container.

(5) The reception device according to any one of (1) to (4) above, in which mixing process information is inserted in a layer of the stream or a layer of the container, and the processing unit performs the inverse mixing process on the basis of the mixing process information.

(6) The reception device according to (5) above, in which the mixing process information includes information on a mixing ratio in the mixing process.

(7) The reception device according to (5) or (6) above, in which the mixing process information includes information indicating a temporal relative positional relationship between the one picture and the other picture in the units of two consecutive pictures.

(8) The reception device according to any one of (1) to (7) above, further including a display unit that displays an image by the image data of the predetermined frame rate obtained by the processing unit.

(9) The reception device according to any one of (1) to (8) above, in which the reception unit receives the container via a broadcast transmission path.

(10) A reception method having a receiving procedure that receives a container including a base stream and an enhanced stream, in which the base stream is obtained by obtaining image data of each picture of a base layer by performing a mixing process in units of two temporally consecutive pictures in image data at a predetermined frame rate, and encoding the image data of each picture of the base layer, the mixing process is performed in a linear space or a non-linear space, the enhanced stream is obtained by obtaining the image data of each picture of the enhanced layer by extracting image data of one picture in the units of two temporally consecutive pictures, and encoding the image data of each picture of the enhanced layer, the reception method further includes a procedure to perform a process of decoding the base stream to obtain the image data of each picture of the base layer, a process of decoding the enhanced stream to obtain image data of one picture in the units of two consecutive pictures of the image data at the predetermined frame rate, which is the image data of each picture of the enhanced layer, a process of performing an inverse mixing process, which is an inverse process of the mixing process, on the image data of each picture of the base layer by using the image data of the one picture to obtain image data of the other picture in the units of two temporally consecutive pictures, and a process of combining the image data of the one picture and the image data of the other picture to obtain image data at the predetermined frame rate, and the inverse mixing process is performed in a corresponding space on the basis of processing space information indicating whether the mixing process is performed in the linear space or performed in the non-linear space.

(11) The reception method according to (10) above, in which the processing space information is inserted in a layer of the base stream or a layer of the enhanced stream.

(12) The reception method according to (11) above, in which the base stream and the enhanced stream have a NAL unit structure, and the base stream or the enhanced stream includes a NAL unit including the processing space information.

(13) The reception method according to any one of (10) to (12) above, in which the processing space information is inserted in a layer of the container.

(14) The reception method according to any one of (10) to (13) above, in which mixing process information is inserted in a layer of the stream or a layer of the container, and the inverse mixing process is performed on the basis of the mixing process information.

(15) The reception method according to (14) above, in which the mixing process information includes information on a mixing ratio in the mixing process.

(16) The reception method according to (14) or (15) above, in which the mixing process information includes information indicating a temporal relative positional relationship between the one picture and the other picture in the units of two consecutive pictures.

(17) The reception method according to any one of (10) to (16) above, in which the image data of the predetermined frame rate obtained by the processing unit is supplied to a display unit that displays an image by the image data.

(18) The reception method according to any one of (10) to (17) above, in which the container is received via a broadcast transmission path.

(19) A transmission device including:

a processing unit that obtains a base stream by obtaining image data of each picture of a base layer by performing a mixing process in units of two temporally consecutive pictures in image data at a predetermined frame rate, and encoding the image data of each picture of the base layer, and obtains an enhanced stream by obtaining the image data of each picture of the enhanced layer by extracting image data of one picture in the units of two temporally consecutive pictures, and encoding the image data of each picture of the enhanced layer; and a transmission unit that transmits the base stream and the enhanced stream, in which the processing unit performs the mixing process in a linear space.

(20) A transmission method including:

a procedure of obtaining a base stream by obtaining image data of each picture of a base layer by performing a mixing process in units of two temporally consecutive pictures in image data at a predetermined frame rate, and encoding the image data of each picture of the base layer, and obtaining an enhanced stream by obtaining the image data of each picture of the enhanced layer by extracting image data of one picture in the units of two temporally consecutive pictures, and encoding the image data of each picture of the enhanced layer; and a procedure of transmitting the base stream and the enhanced stream, in which the mixing process is performed in a linear space.

The main feature of the present technology is that the inverse mixing process for the image data of each picture in the base layer is performed on the basis of the processing space information indicating whether the mixing process is performed in the linear space or the non-linear space. Thus, the reverse mixing process on the reception side can be appropriately performed (see FIG. 3, FIG. 15, FIG. 26, and FIG. 27).

REFERENCE SIGNS LIST

10 Transmission-reception system
100 Transmission device
101 Control unit
102 Camera
103 HFR processing unit
104 Opto-electronic conversion unit
105 Encoding unit
106 Multiplexer
107 Transmission unit
121 Low-speed shutter camera
122 High-speed shutter camera
123 Selector
124 Pre-processor (linear space)
151 Electro-optical conversion unit
152 Pre-processor (linear space)
153 Opto-electronic conversion unit
154 Pre-processor (non-linear space)
155 Encoder
160 Processor
200, 200A, 200B, 200C Television receiver
201 Control unit
202, 202B, 202C Electro-optical conversion unit
203 HFR processing unit
204, 204B, 204C Display unit
205 Control unit
206 Reception unit
207 Demultiplexer
211, 211B, 211C Decoder
212 Post-processor (non-linear space)
231 Post-processor (linear space)
240 Post-processor

The invention claimed is:

1. A reception device comprising:

circuitry configured to:

receive a container including a base stream and an enhanced stream, wherein:

the base stream is obtained by obtaining image data of each picture of a base layer by performing a mixing process in units of two temporally consecutive pictures in image data at a predetermined frame rate, and encoding the image data of each picture of the base layer, the mixing process having been performed in a linear space before opto-electronic conversion, or a non-linear space after opto-electronic conversion, the enhanced stream is obtained by obtaining image data of each picture of an enhanced layer by extracting image data of one picture in the units of two temporally consecutive pictures, and encoding the image data of each picture of the enhanced layer, the circuitry is configured to:

decode the base stream to obtain the image data of each picture of the base layer, decode the enhanced stream to obtain image data of one picture in the units of two temporally consecutive pictures of the image data at the predetermined frame rate, which is the image data of each picture of the enhanced layer, perform an inverse mixing process, which is an inverse process of the mixing process, on the image data of each picture of the base layer by using the image data of the one picture to obtain image data of the other picture in the units of two temporally consecutive pictures, and combine the image data of the one picture and the image data of the other picture to obtain image data at the predetermined frame rate, and the circuitry is configured to perform the inverse mixing process in a corresponding space on a basis of processing space information indicating whether the mixing process is performed in the linear space or performed in the non-linear space.

2. The reception device according to claim 1, wherein the processing space information is inserted in a layer of the base stream or a layer of the enhanced stream.

3. The reception device according to claim 2, wherein the base stream and the enhanced stream have a NAL unit structure, and the base stream or the enhanced stream includes a NAL unit including the processing space information.

4. The reception device according to claim 1, wherein the processing space information is inserted in a layer of the container.

5. The reception device according to claim 1, wherein
mixing process information is inserted in a layer of the base stream, the enhanced stream, or a layer of the container, and
the circuitry is configured to perform the inverse mixing process on a basis of the mixing process information.

6. The reception device according to claim 5, wherein the mixing process information includes information on a mixing ratio in the mixing process.

7. The reception device according to claim 5, wherein the mixing process information includes information indicating a temporal relative positional relationship between the one picture and the other picture in the units of two temporally consecutive pictures.

8. The reception device according to claim 1, further comprising a display configured to display an image by the image data of the predetermined frame rate obtained by the circuitry.

9. The reception device according to claim 1, wherein the circuitry is configured to receive the container via a broadcast transmission path.

10. A reception method comprising
receiving a container including a base stream and an enhanced stream,
wherein:
the base stream is obtained by obtaining image data of each picture of a base layer by performing a mixing process in units of two temporally consecutive pictures in image data at a predetermined frame rate, and encoding the image data of each picture of the base layer, the mixing process having been performed in a linear space before opto-electronic conversion, or a non-linear space after opto-electronic conversion,
the enhanced stream is obtained by obtaining image data of each picture of an enhanced layer by extracting image data of one picture in the units of two temporally consecutive pictures, and encoding the image data of each picture of the enhanced layer,
the reception method further comprises:
decoding the base stream to obtain the image data of each picture of the base layer,
decoding the enhanced stream to obtain image data of one picture in the units of two temporally consecutive pictures of the image data at the predetermined frame rate, which is the image data of each picture of the enhanced layer,
performing an inverse mixing process, which is an inverse process of the mixing process, on the image data of each picture of the base layer by using the image data of the one picture to obtain image data of the other picture in the units of two temporally consecutive pictures, and
combining the image data of the one picture and the image data of the other picture to obtain image data at the predetermined frame rate, and
the inverse mixing process is performed in a corresponding space on a basis of processing space information indicating whether the mixing process is performed in the linear space or performed in the non-linear space.

11. The reception method according to claim 10, wherein the processing space information is inserted in a layer of the base stream or a layer of the enhanced stream.

12. The reception method according to claim 11, wherein the base stream and the enhanced stream have a NAL unit structure, and the base stream or the enhanced stream includes a NAL unit including the processing space information.

13. The reception method according to claim 10, wherein the processing space information is inserted in a layer of the container.

14. The reception method according to claim 10, wherein
mixing process information is inserted in a layer of the base stream, the enhanced stream, or a layer of the container, and
the inverse mixing process is performed on a basis of the mixing process information.

15. The reception method according to claim 14, wherein the mixing process information includes information on a mixing ratio in the mixing process.

16. The reception method according to claim 14, wherein the mixing process information includes information indicating a temporal relative positional relationship between the one picture and the other picture in the units of two temporally consecutive pictures.

17. The reception method according to claim 10, wherein the image data of the predetermined frame rate is supplied to a display that displays an image by the image data.

18. The reception method according to claim 10, wherein the container is received via a broadcast transmission path.

19. A transmission device comprising:
processing circuitry configured to:
obtain a base stream by obtaining image data of each picture of a base layer by performing a mixing process in units of two temporally consecutive pictures in image data at a predetermined frame rate, and encoding the image data of each picture of the base layer, wherein the mixing process is performed in a linear space before opto-electronic conversion or a non-linear space after opto-electronic conversion,
obtain an enhanced stream by obtaining the image data of each picture of an enhanced layer by extracting image data of one picture in the units of two temporally consecutive pictures, and encoding the image data of each picture of the enhanced layer, and
transmit the base stream, the enhanced stream, and processing space information, wherein the processing space information indicates whether the mixing process in the units of two temporally consecutive pictures is performed in the linear space or the non-linear space.

20. A transmission method comprising:
obtaining a base stream by obtaining image data of each picture of a base layer by performing a mixing process in units of two temporally consecutive pictures in image data at a predetermined frame rate, and encoding the image data of each picture of the base layer, wherein the mixing process is performed in a linear space before opto-electronic conversion or a non-linear space after opto-electronic conversion;
obtaining an enhanced stream by obtaining the image data of each picture of an enhanced layer by extracting image data of one picture in the units of two temporally consecutive pictures, and encoding the image data of each picture of the enhanced layer; and transmitting the base stream, the enhanced stream, and processing space information, wherein the processing space information indicates whether the mixing process in the units of two temporally consecutive pictures is performed in the linear space or the non-linear space.

* * * * *